(12) United States Patent
Farmer et al.

(10) Patent No.: US 8,182,877 B2
(45) Date of Patent: May 22, 2012

(54) METHOD OF MANUFACTURING COMPOSITE MATERIAL

(75) Inventors: Benjamin Lionel Farmer, Bristol (GB); Daniel Mark Johns, Bristol (GB); John Maurice Price, Bristol (GB)

(73) Assignee: Airbus Operations Limited, Bristol (GB)

( * ) Notice: Subject to any disclaimer, the term of this patent is extended or adjusted under 35 U.S.C. 154(b) by 78 days.

(21) Appl. No.: 12/395,793

(22) Filed: Mar. 2, 2009

(65) Prior Publication Data
US 2009/0169825 A1    Jul. 2, 2009

Related U.S. Application Data

(63) Continuation-in-part of application No. PCT/GB2007/050509, filed on Aug. 29, 2007.

(60) Provisional application No. 60/824,568, filed on Sep. 5, 2006.

(30) Foreign Application Priority Data

Sep. 5, 2006 (GB) .................................. 0617459.3

(51) Int. Cl.
*B05D 1/36* (2006.01)
*B05D 1/18* (2006.01)

(52) U.S. Cl. .................. 427/402; 427/404; 427/407.1; 427/255.15; 427/430.1

(58) Field of Classification Search ................. 427/430.1
See application file for complete search history.

(56) References Cited

U.S. PATENT DOCUMENTS

| 4,560,603 A | 12/1985 | Giacomel |
| 5,133,994 A * | 7/1992 | Barbaza .................... 427/248.1 |
| 5,814,408 A * | 9/1998 | Ting et al. .................... 428/408 |

(Continued)

FOREIGN PATENT DOCUMENTS

EP    1059266 A2    12/2000

(Continued)

OTHER PUBLICATIONS

Fan S et al., "Self-Oriented Regular Arrays of Carbon Nanotubes and Their Field Emission Properties," Jan. 22, 1999, Science, American Association for the Advancement of Science, US, pp. 512-514, XP00093011.

(Continued)

*Primary Examiner* — David Turocy
(74) *Attorney, Agent, or Firm* — Lowe, Hauptman, Ham & Berner, LLP

(57) ABSTRACT

A method of manufacturing a composite material, the method comprising: growing two or more layers of reinforcement in-situ; and impregnating each layer with a matrix before growing the next layer. The reinforcement layers may be formed by a chemical vapor deposition process. The method can be used as an additive layer manufacturing technique to form a component with a desired shape and physical characteristics.

30 Claims, 30 Drawing Sheets

U.S. PATENT DOCUMENTS

| | | | |
|---|---|---|---|
| 5,837,081 A * | 11/1998 | Ting et al. | 156/89.26 |
| 6,265,466 B1 | 7/2001 | Glatkowski et al. | |
| 6,428,890 B1 * | 8/2002 | Ting | 428/361 |
| 6,749,712 B2 | 6/2004 | Kuper | |
| 6,790,425 B1 | 9/2004 | Smalley et al. | |
| 6,808,746 B1 | 10/2004 | Dai et al. | |
| 6,841,003 B2 | 1/2005 | Kang et al. | |
| 6,913,794 B2 | 7/2005 | Hoult et al. | |
| 7,258,896 B2 * | 8/2007 | Deckard et al. | 427/256 |
| 7,815,973 B2 | 10/2010 | Geohegan et al. | |
| 2002/0018745 A1 | 2/2002 | Herman | |
| 2003/0111333 A1 | 6/2003 | Montgomery et al. | |
| 2003/0131932 A1 | 7/2003 | Hoult et al. | |
| 2004/0247808 A1 * | 12/2004 | Cooper et al. | 428/36.1 |
| 2004/0266065 A1 * | 12/2004 | Zhang et al. | 438/122 |
| 2005/0061496 A1 | 3/2005 | Matabayas, Jr. | |
| 2005/0123467 A1 * | 6/2005 | Harutyunyan | 423/447.1 |
| 2005/0127030 A1 | 6/2005 | Watanabe et al. | |
| 2005/0167647 A1 * | 8/2005 | Huang et al. | 257/14 |
| 2005/0176329 A1 * | 8/2005 | Olry et al. | 442/388 |
| 2006/0025515 A1 | 2/2006 | Scaringe et al. | |
| 2006/0083927 A1 | 4/2006 | Von Ehr, II | |

FOREIGN PATENT DOCUMENTS

| | | | |
|---|---|---|---|
| JP | 2007224359 A | 9/2007 | |
| WO | 0185612 A2 | 11/2001 | |
| WO | 0239051 A2 | 5/2002 | |
| WO | 03025493 A1 | 3/2003 | |
| WO | 2004053464 A1 | 6/2004 | |

OTHER PUBLICATIONS

R.T.K. Baker et al., "Nucleation and Growth of Carbon Deposits From the Nickel Catalyzed Decomposition of Acetylene," Journal of Catalysis, vol. 26, 1972, pp. 51-62, XP002458839.

Thostenson et al., "Aligned Multi-Walled Carbon Nanotube-Reinforced Composites: Processing and Mechanical Characterization," Journal of Physics D: Applied Physics, vol. 35, 2002, pp. 77-80.

Exploring Carbon Nanotubes, ORNL Review, vol. 35, No. 3, 2002.

Kramer, "Transitioning Single Wall Carbon Nanotube Composites to Aerostructures,".

Dr. Czerw, "Lightweight Electronic Enclosures Incorporating Nanotubes," DoD SBIR FY06.1—Solicitation Selections w/Abstracts.

NANO Lab, "Preparation of Composites From Buckypaper," Revision Date Mar. 15, 2006.

Andrews, "Synthesis and Processing of Nanotube Composite Materials," Center for Applied Energy Research, University of Kentucky, 2003.

XP-002459292.

ISR for PCT/GB2007/050509 dated Mar. 12, 2007.

British Search Report for GB0617459.3 dated Dec. 22, 2006.

Campbell, F.C., "Ply Collation: A major cost driver," 2004, Elsevier, Oxford, UK, XP002525222, pp. 131-173.

EP Search Report for 11185691.0 dated Nov. 29, 2011.

* cited by examiner

METHOD OF MANUFACTURING COMPOSITE MATERIAL

RELATED APPLICATIONS

The present application is a continuation-in-part of International Application Number PCT/GB2007/050509 filed Aug. 29, 2007, and claims priority from British Application Number 0617459.3 filed Sep. 5, 2006 and U.S. Provisional Application No. 60/824,568 filed Sep. 5, 2006, the disclosures of which are hereby incorporated by reference herein in their entirety.

FIELD OF THE INVENTION

The present invention relates to a method of manufacturing a composite material.

BACKGROUND OF THE INVENTION

Nanocomposites based on carbon nanotubes are described in E. T. Thostenson and T-W. Chou, "Aligned Multi-Walled Carbon Nanotube-Reinforced Composites: Processing and Mechanical Characterization," *Journal of Physics D: Applied Physics,* 35(16) L77-L80 (2002). According to this paper, one of the most significant challenges towards improving the properties of the nanocomposite is to obtain a uniform dispersion of nanotubes within the polymer matrix. The solution presented in this paper is a micro-scale twin-screw extruder.

SUMMARY OF THE INVENTION

A first aspect of the invention provides a method of manufacturing a composite material, the method comprising:
  growing two or more layers of reinforcement in-situ; and
  impregnating each layer with a matrix before growing the next layer.

A further aspect of the invention provides a composite material comprising two or more layers of reinforcement which have been grown in-situ, and a matrix impregnating the or each layer.

A further aspect of the invention provides apparatus for manufacturing a composite material, the apparatus comprising:
  a system for growing two or more layers of reinforcement in-situ;
  an impregnation system for applying matrix material so as to impregnate the or each layer.

The invention provides an alternative solution to the dispersion problem. Instead of attempting to disperse the reinforcement within the matrix, the reinforcement is grown in-situ, and each layer is impregnated with the matrix before growth of the next layer.

The reinforcement layers may be aligned by applying an electromagnetic field during the growth phases. The electromagnetic field may be applied with the same orientation for all layers, or at a first angle to a first one of the layers, and at a second angle to a second one of the layers, enabling reinforcement elements in each layer to be grown at a different angle.

Growth of the reinforcement layers may be enhanced by forming a plasma during growth of the or each layer. This enables growth to be carried out at lower temperatures, typically in the range of 25-500° C.

The layers of reinforcement may be grown in-situ by an arc discharge process, in which stock material contained in a negative electrode sublimates because of the high temperatures caused by the discharge. Alternatively the layers of reinforcement may be grown in-situ by a laser ablation process, in which a pulsed laser vaporizes a target in a high temperature reactor while an inert gas is bled into a process chamber. The reinforcement layers develop on the cooler surfaces of the reactor, as the vaporized material condenses. In the case of arc discharge or laser ablation, the elements (such as carbon nanotubes) making up the reinforcement layers are formed in a gaseous state, and in-situ growth of the layers occurs by condensation of the elements on a substrate. However a problem with such arc discharge and laser ablation processes is that they are not suited to high volume production, and tend to require high temperatures. Therefore preferably the method further comprises forming one or more layers of catalyst particles to catalyse the growth of the reinforcement, for instance as part of a chemical vapour deposition process. This enables growth to be carried out at lower temperatures, typically in the range of 25-500° C. In this case the layers grow by in-situ growth of the elements making up the reinforcement layers, instead of growing by accumulation of pre-formed elements.

Preferably a respective layer of catalyst particles is provided for each layer of reinforcement. This enables at least two of the layers of catalyst particles to be provided with different shapes and/or different catalyst particle packing densities (interlayer and/or intralayer).

The catalyst particles may be deposited directly, through the precipitation of metal salts held in solution in water or alcohol, or they may be deposited as a colloid suspension. Preferably the catalyst particles are deposited by spraying droplets containing catalyst as a suspension or solution onto a surface, for instance from a printing head.

Alternatively the matrix may comprise a catalytic matrix material which catalyses the growth of the next layer. For instance the matrix may comprise a metal such as Iron, Nickel, Cobalt or an alloy thereof. Advantageously the metal alloy comprises an element of Carbon, since this will prevent the carbon reinforcement phase dissolving into the alloy. For instance the metal alloy may comprise an Fe—C alloy.

In the embodiment described below, 100% of the matrix material consists of such a catalytic matrix material. However it will be understood that the matrix material may have more than one phase, in which case over 50% by weight of the matrix comprises catalytic material. The advantage of using a catalytic matrix material is that there is no need to perform the separate step of depositing a distinct layer of catalyst particles on top of a previously deposited layer of matrix.

Typically the method further comprises heating the matrix during impregnation, using a laser or other heat source. The matrix material may be deposited onto the reinforcement layer as a separate layer which is subsequently heated in-situ to impregnate the reinforcement layer. For instance a powder layer may be deposited which is heated in-situ to impregnate the reinforcement. Alternatively each reinforcement layer may be impregnated by vapour or spray deposition of a series of layers of matrix material. This has an advantage over powder deposition in that the reinforcement layer can be impregnated in a single step, instead of requiring separate powder deposition and in-situ heating steps. By way of example each reinforcement layer may be impregnated by:
  chemical vapour deposition in which a vapour reacts and/or decomposes on the substrate surface to produce the desired deposit (for instance deposition of pyrolytic carbon);
  physical vapour deposition in which a vapour condenses onto the substrate surface (for instance sputter deposition or pulsed laser deposition); or spray deposition in which melted (or heated) materials are sprayed onto the substrate surface (for example plasma spray deposition).

Where vapour or spray deposition is used then the method may further comprise masking different selected areas of at least two of the layers of reinforcement with different shaped masks during the impregnation process whereby different areas of the at least two layers are impregnated by vapour or spray deposition.

Impregnation may occur by a process of capillary action, by condensation or decomposition, or by any other suitable mechanism.

The matrix may be a metal such as Titanium, Fe—C alloy or Co—Cr alloy, a polymer—for instance a thermosetting resin or a thermoplastic material such as polyetheretherketone (PEEK), or substantially pure Carbon.

At least two of the layers of reinforcement may be impregnated and/or grown with different shapes. This enables the composite material to form any desired shape, in the manner of a so-called "additive layer manufacturing" or "rapid manufacturing" process.

At least two of the layers of reinforcement may also be grown with different packing densities. Furthermore, at least one of the layers of reinforcement may be grown with a packing density which varies across the layer. This enables the material to be selectively reinforced.

The reinforcement layers typically comprise reinforcement elements having an elongate structure such as tubes, fibres or plates. The reinforcement elements may be solid or tubular. For instance the reinforcement elements may be single walled carbon nanotubes; multi-walled carbon nanotubes, carbon nanofibres; or carbon nanotubes coated with a layer of amorphous carbon.

Preferably at least one of the reinforcement layers comprises reinforcement elements having an aspect ratio greater than 100.

Preferably at least one of the reinforcement layers comprises reinforcement elements having a diameter less than 100 nm.

The reinforcement may be formed of any material such as silicon carbide or alumina, but preferably at least one of the reinforcement layers comprises carbon fibres. This is preferred due to the strength and stiffness of the carbon-carbon bond.

The reinforcement elements in each layer may be grown end-to-end (for instance by re-using a single layer of catalyst particles to grow each layer); or in an overlapping configuration in which at least one of the layers of reinforcement is only partially impregnated with the matrix through a first part of its thickness, leaving a second part of the thickness of the layer exposed whereby the next layer partially overlaps with it.

BRIEF DESCRIPTION OF THE DRAWINGS

Embodiments of the invention will now be described with reference to the accompanying drawings, in which:

FIGS. 27-30 shows an alternative process in which subsequent layers are formed with different shapes by masking.

DETAILED DESCRIPTION OF EMBODIMENT(S)

Figure 1:
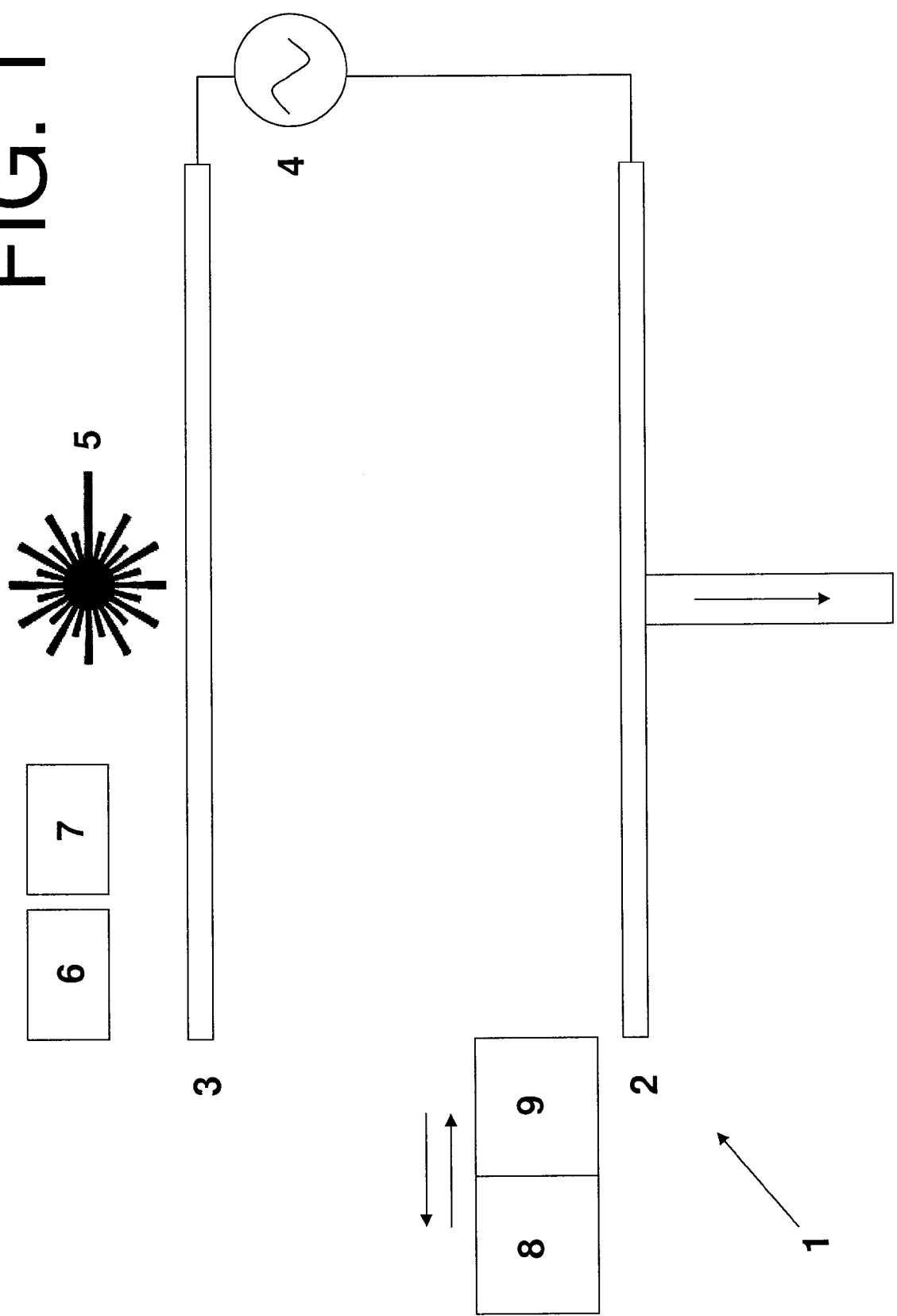
FIGS. 1-10 show various steps in the manufacture of a multi-layer thermoplastic matrix composite material.

The apparatus 1 shown in FIG. 1 is housed within a process chamber (not shown). A negative plasma source electrode 2 and a positive plasma source electrode 3 are connected by a power source 4. A laser 5 is positioned above the positive plasma source 3, and is associated with a raster scanning mechanism (not shown). A gas supply 6 can be turned on and off to supply a pre-heated process gas to the chamber, such as $CH_4/H_2$. A second gas supply 7 can be turned on and off to supply an inert gas such as $N_2$ to the process chamber. The inert gas is preheated to a temperature at or just below the melting point of the matrix material. The electrode 2 is also heated by a heating element (not shown) to a similar temperature.

A heated hopper 8 and a cooled ink-jet printing head 9 are mounted on a transport mechanism (not shown) which can move the hopper 8 and printing head 9 from left to right in FIG. 1 (that is, from one end of the negative plasma source 2 to the other). A transport mechanism (not shown) is provided for driving the negative plasma source 2 up and down.

FIGS. 1-10 are side views of the apparatus, and thus do not show the third (width) dimension out of the plane of the figures. However, the electrodes 2,3, laser 5, hopper 8 and printing head 9 will extend across the width of the apparatus.

Figure 2:
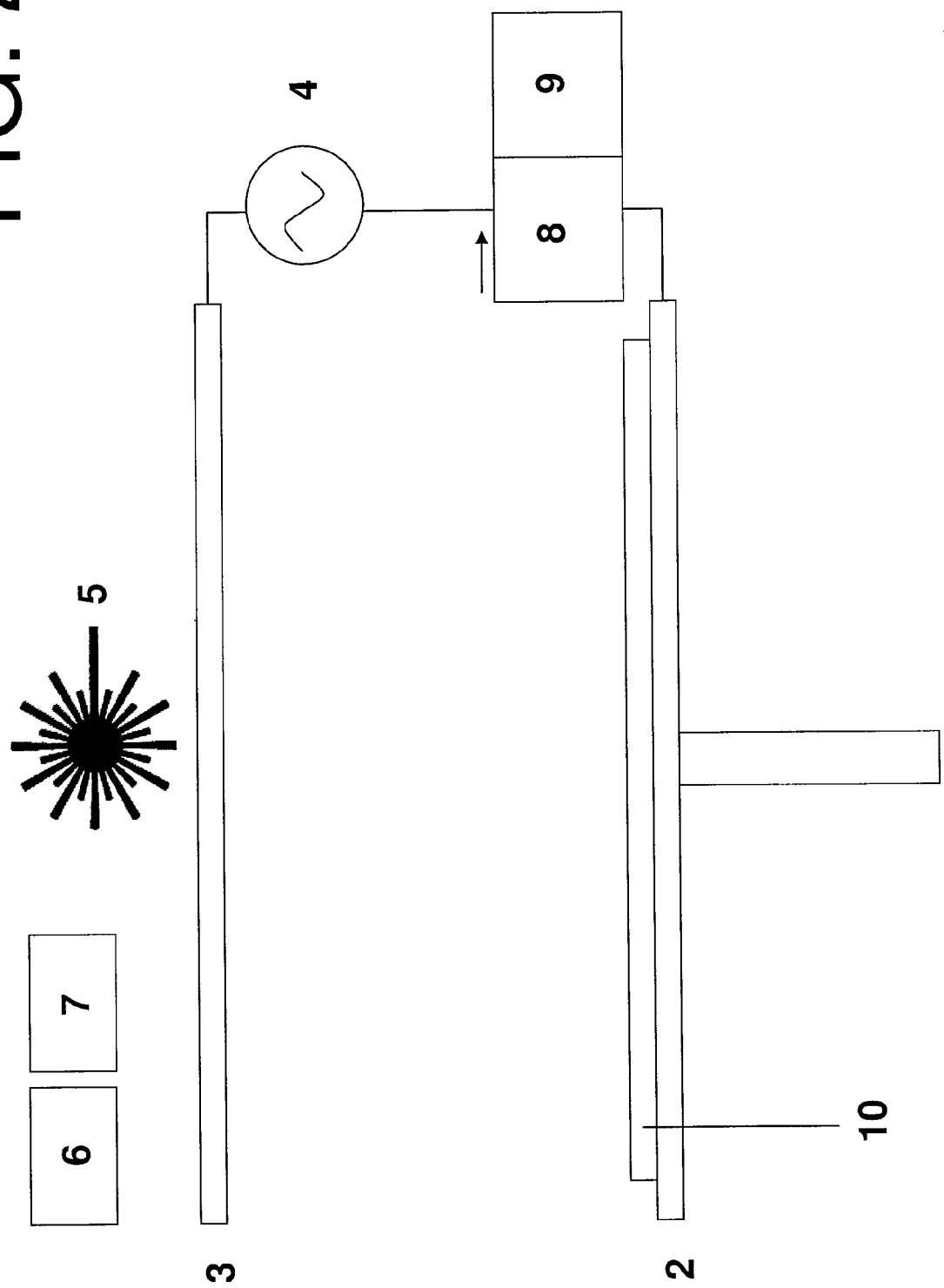

In a first process step shown in FIG. 2, the hopper (8) is filled with a polymer powder such as polyetheretherketone (PEEK). The hopper 8 is moved across the negative plasma source 2, and a dispensing orifice (not shown) in the hopper 8 is opened to deposit a layer 10 of polymer powder. Thus the source 2 also acts as a bed or platform for the additive layer manufacturing process. The orifice is then closed. The inert gas prevents oxidation of the polymer. The laser 5 is turned on and the raster mechanism scans the beam across the layer 10 to consolidate the layer 10. The heating effect of the laser beam causes the polymer layer 10 to melt. A shutter (not shown) in the path of the laser beam is opened and closed selectively to modulate the beam as it is scanned over the layer 10. Thus the layer 10 is consolidated only in the areas required to form a desired shape. More specifically, the shutter is opened and closed in accordance with a computer-aided design (CAD) model which defines a series of slices through the desired three-dimensional shape.

Figure 3:
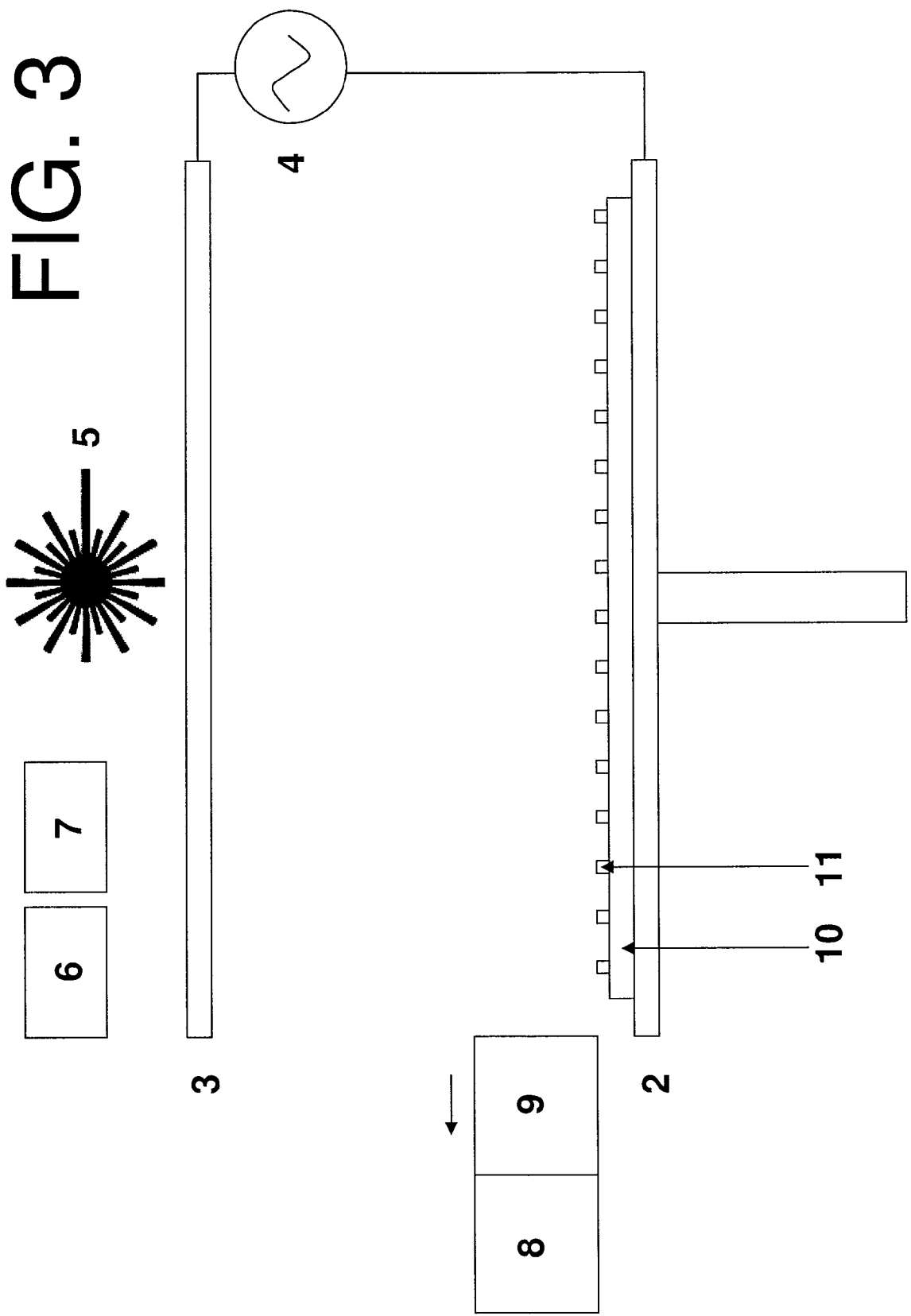
Figure 4:
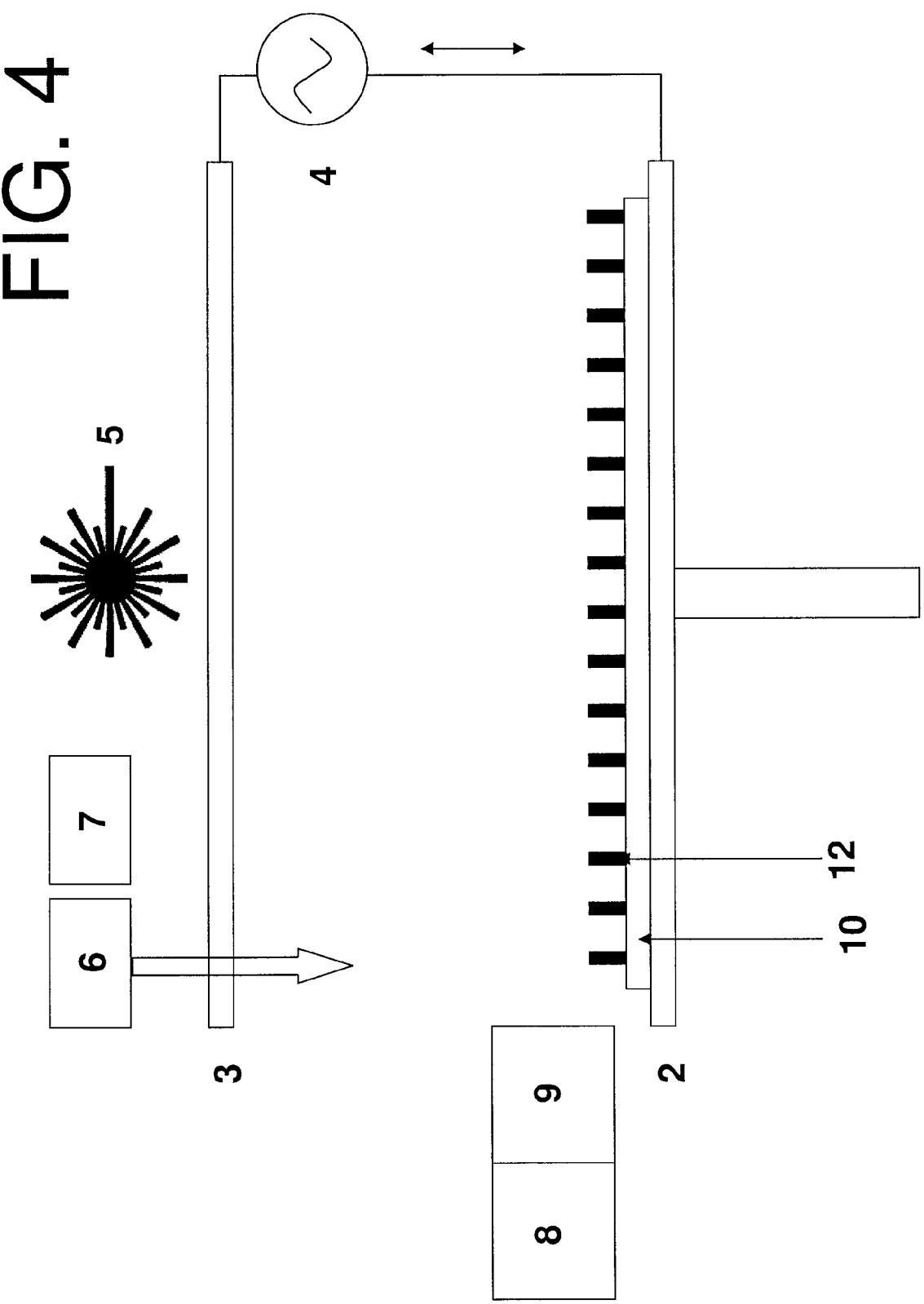

In a second process step shown in FIG. 3, the printing head 9 is moved across the layer 10 to deposit an array of catalyst particles 11. The printing head 9 sprays an array of colloid drops onto the layer 10, and as the colloid evaporates in the high temperature inert gas environment, metal catalyst particles 11 suspended in the colloid drops are deposited. The catalyst particles 11 may be, for example a metal, preferably transition metals Fe, Ni or Co, or alloys thereof, and the colloid liquid may be, for example alcohol, water, oil, or a mixture thereof. A fluid-based cooling system (not shown) cools the printing head 9 and a reservoir (not shown) containing the printing fluid to prevent the colloid liquid from boiling before it is printed. The printing orifice of the printing head 9 (which emits the spray of droplets) is positioned sufficiently close to the layer 10 to ensure that the colloid liquid does not evaporate deleteriously in flight, before hitting the layer 10.

Although the catalyst particles 11 are shown in FIG. 3 for purposes of illustration with a regular spacing along the length of the layer 10, the spacing between the particles will be essentially random in both the length and width dimensions.

The diameter of each catalyst particle is typically in the range of 1 nm-1 µm, and the catalyst particles may be close-packed, or spaced apart.

Optionally the catalyst material may be conditioned as part of the second process step shown in FIG. 3, through a process of spherulisation and/or oxidation and/or reduction, depending on the catalyst type. This conditioning is performed by the combination of heating and supply of an oxidising and/or reducing gas, depending on the catalyst type In a third process step shown in FIG. 4, the carbonaceous feed stock is introduced from the gas supply 6 and the power source 4 is turned on to generate a plasma between the electrodes 2, 3. This causes the in-situ growth of a layer of nanofibres 12, aligned with the direction of the electromagnetic field between the electrodes 2,3. The growth mechanism is as described by Baker (Baker, R. T. K., Barber, M. A., Harris, P. S., Feates, F. S. & Waire, R. J. J J Catal 26 (1972). It is generally accepted that the carbonaceous gas is dissociated on the surface of the metal catalyst particle and carbon is adsorbed onto the surface where it is then transported by diffusion to the precipitating face forming a carbon filament with the catalyst particle at the tip. Discussion is ongoing with regards to whether this diffusion is through the bulk of the catalyst or along its surface(s) and to whether the diffusion is driven by a carbon concentration or thermal gradient. Thus when the growth process is complete, a "forest" of nanofibres 12 is produced, each nanofibre 12 carrying a catalyst particle 11 at its tip.

The catalyst particles and plasma enable the nanofibre growth to occur at a relatively low temperature, lower than the melting point of the matrix.

The diameter of the nanofibres is typically in the range of 1 nm-1 μm. Thus, although described as "nanofibres", the diameter of the fibres 12 may exceed 100 nm if desired.

Figure 5:
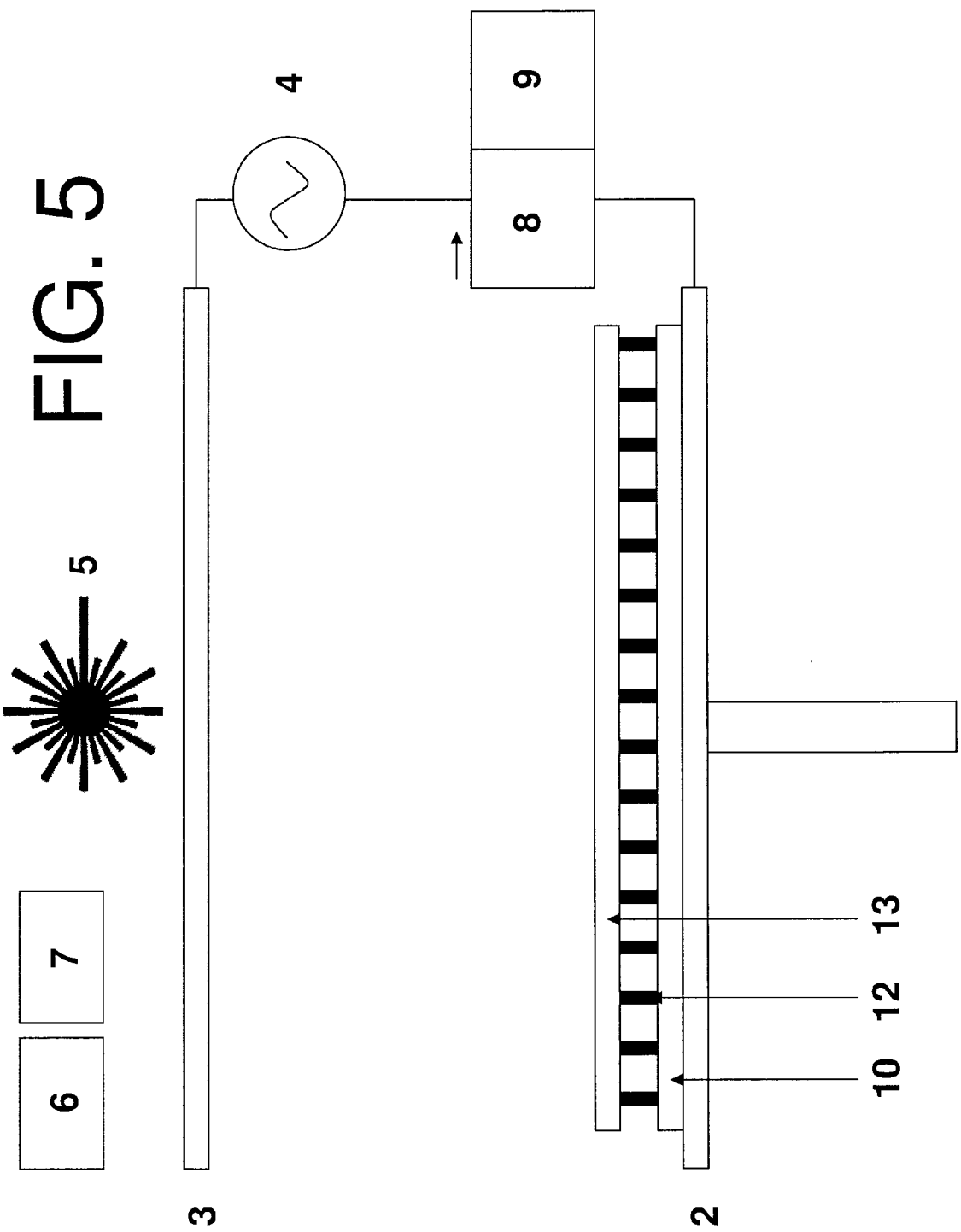

Once nanofibres 12 of a suitable length have been grown, the plasma power source 4 and gas supply 6 are turned off, the inert gas is purged, and in a fourth process step shown in FIG. 5, the platform 2 is lowered and the hopper 8 is moved along the layer of nanofibres 12 to deposit a further layer 13 of polymer powder. The polymer powder size is typically three orders of magnitude larger than the diameter of the nanofibres 12 and significantly greater than the spaces between the nanofibres 12. As a result, the polymer powder layer 13 sits on top of the layer of nanofibres 12 as shown in FIG. 5. The layer 13 has a thickness which is some multiple of the polymer powder size of 20-50 μm—typically of the order of 0.2-0.5 mm.

Figure 6:
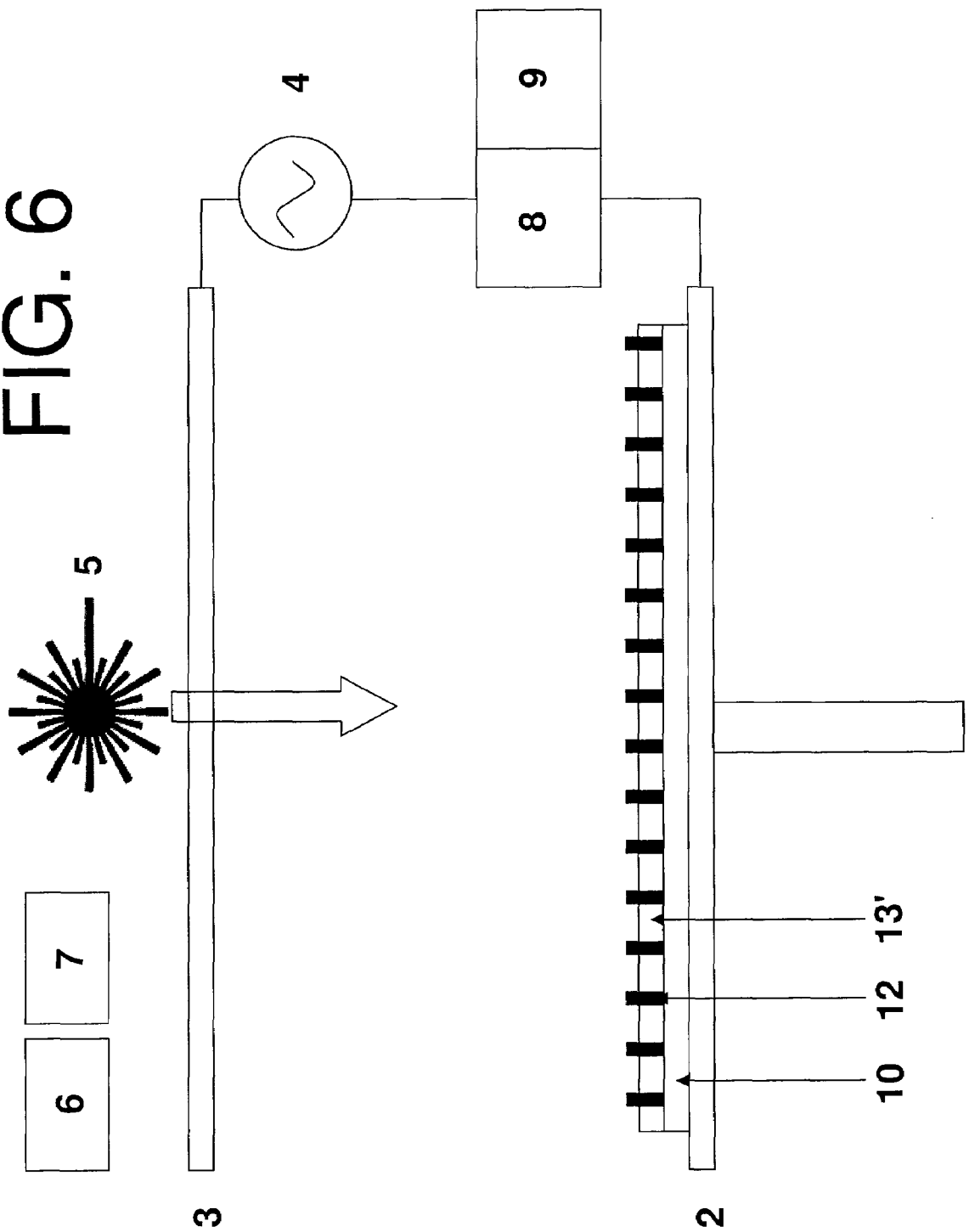

In a fifth process step shown in FIG. 6, the laser 5 is turned on and the raster mechanism scans the beam across the layer 13 to form a consolidated layer 13'. During the raster scan, the shutter is opened and closed as required to form the consolidated layer 13' in a desired shape.

The thickness of the unconsolidated polymer layer 13 is selected so that the layer of nanofibres 12 is only partially impregnated with the matrix through a lower part of its thickness, leaving an upper part of the layer of nanofibres 12 exposed as shown in FIG. 6. By way of example, the thickness of the unconsolidated layer 13 shown in FIG. 5 may be in the range of 0.2-0.5 mm, and the thickness of the consolidated layer 13' shown in FIG. 6 may be in the range of 0.1-0.25 mm. Thus in this case the nanofibres 12, being slightly longer than the layer of consolidated matrix 13', will have lengths exceeding 0.1 mm and aspect ratios exceeding 100. Although the ratio between the length of the fibres 12 and the thickness of the consolidated layer 13' is of the order of 2:1 in FIG. 6, this is for illustrative purposes only and in practice a much smaller degree of overlap (for instance a ratio of 1.05:1) will be required to give significant interlayer reinforcement.

The laser is then turned off and the five process steps shown in FIGS. 2-6 are repeated to build up a series of layers of nanofibres; each layer being impregnated with a matrix before depositing the next layer.

Figure 7:
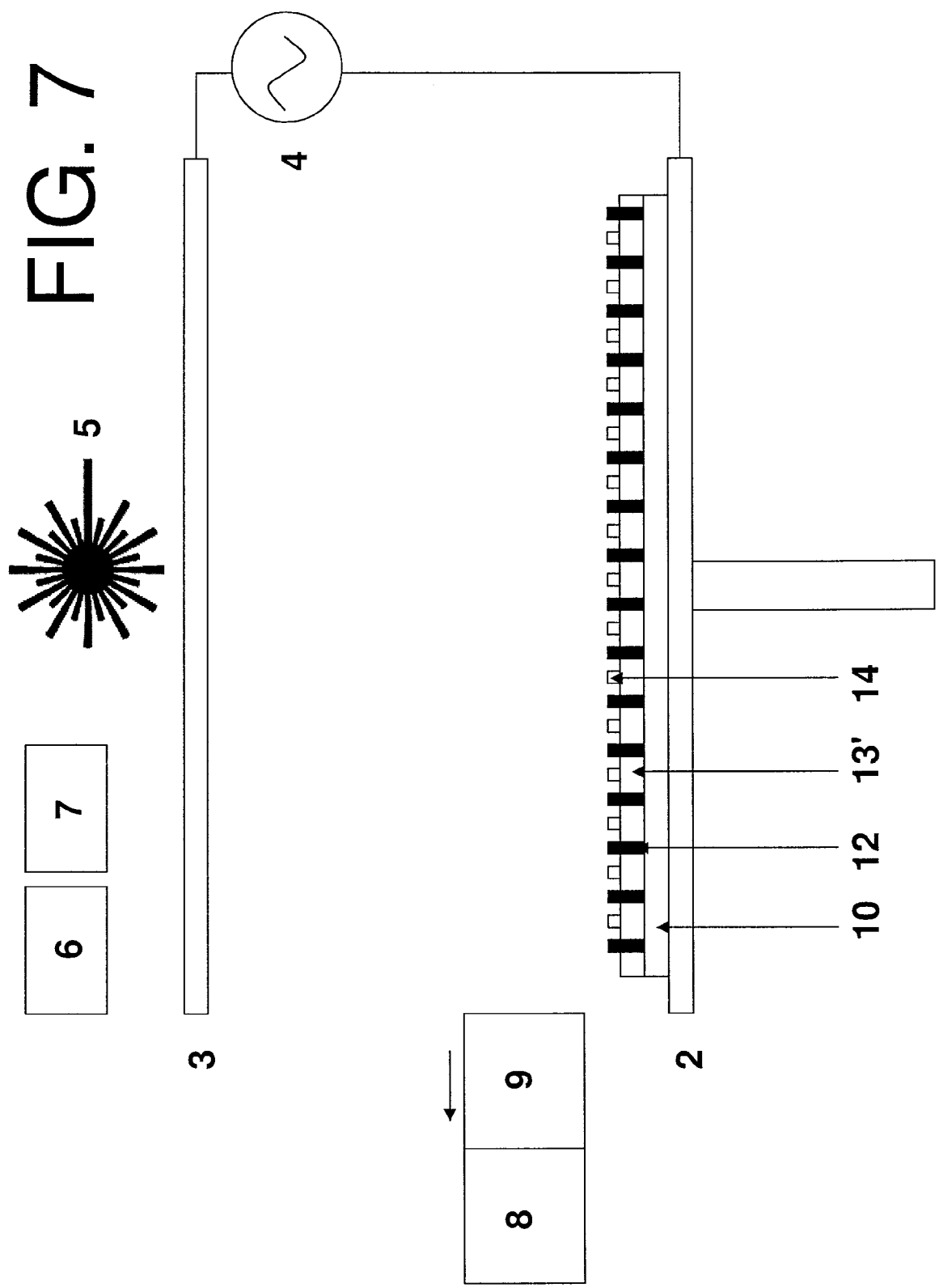

Thus in the first repeat, a second layer of catalyst particles 14 is deposited as shown in FIG. 7. In FIG. 7 the catalyst particles 14 are shown in a regular array, interleaved with the array of nanofibres 12. However the distribution of matrix particles 14 will be essentially random in both the length and width dimensions.

Figure 8:
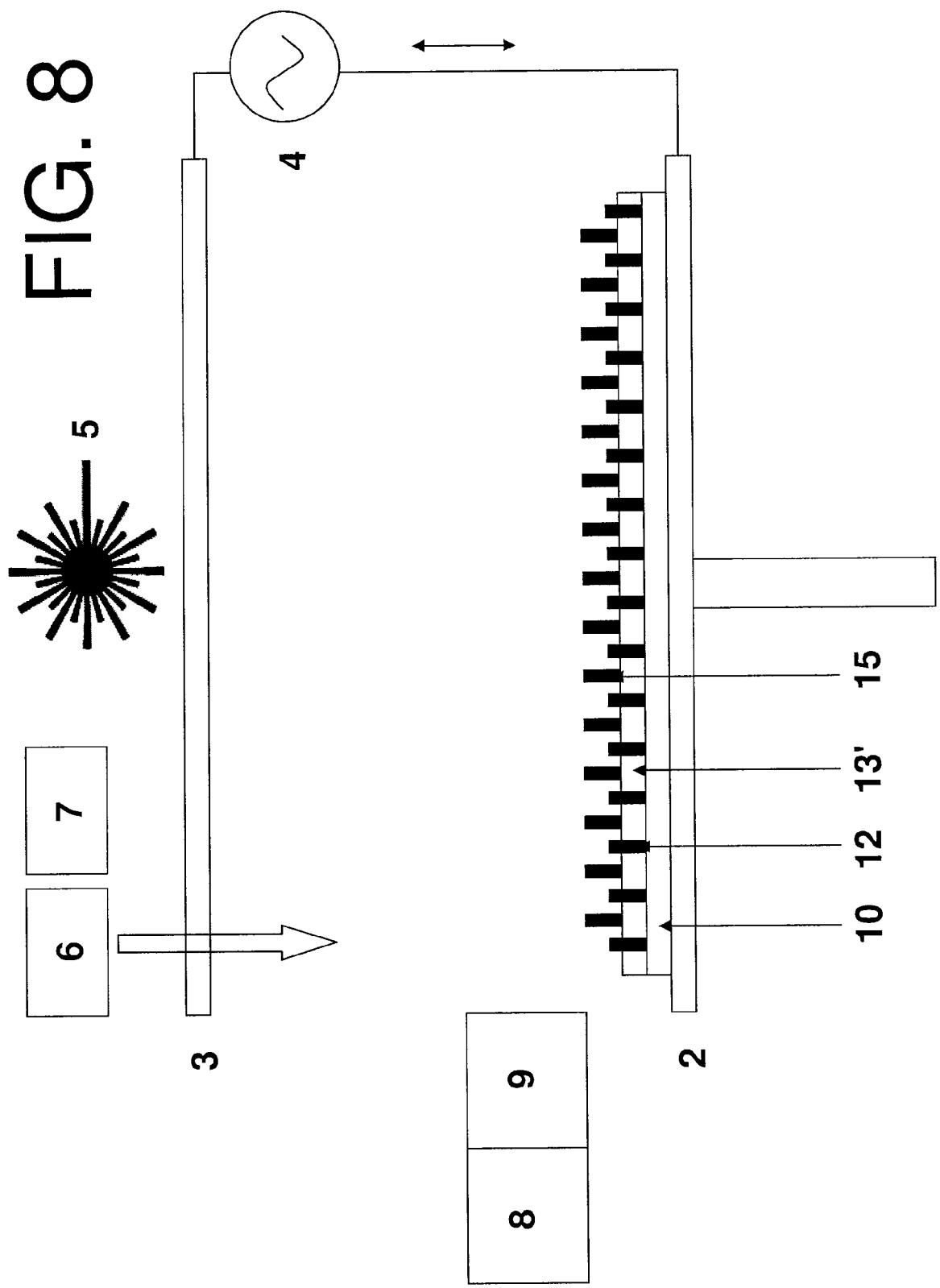

As shown in FIG. 8, a second layer of nanofibres 15 is then grown, catalysed by the catalyst particles 14. Note that the second layer of nanofibres 15 partially overlaps with the previous layer of nanofibres 12. This results in "interlaminar" reinforcement as well as "intralaminar" reinforcement. Although the second layer is shown in FIG. 8 with vertically extending nanofibres 15, in an alternative embodiment the second plasma source 3 may be moved relative to the platform 2 so that the nanofibres in the second layer are aligned in a different direction, for instance at an acute angle such as 45° to the vertical. The electromagnetic field may be re-oriented for each successive layer of nanofibres if desired. A transport mechanism (not shown) is provided to move the plasma source electrode 3 relative to the platform 2 into the position required. Equivalently, a mechanism (not shown) may be provided to move the platform 2, or rotate it, to give the desired angle of electro-magnetic field.

Figure 9:
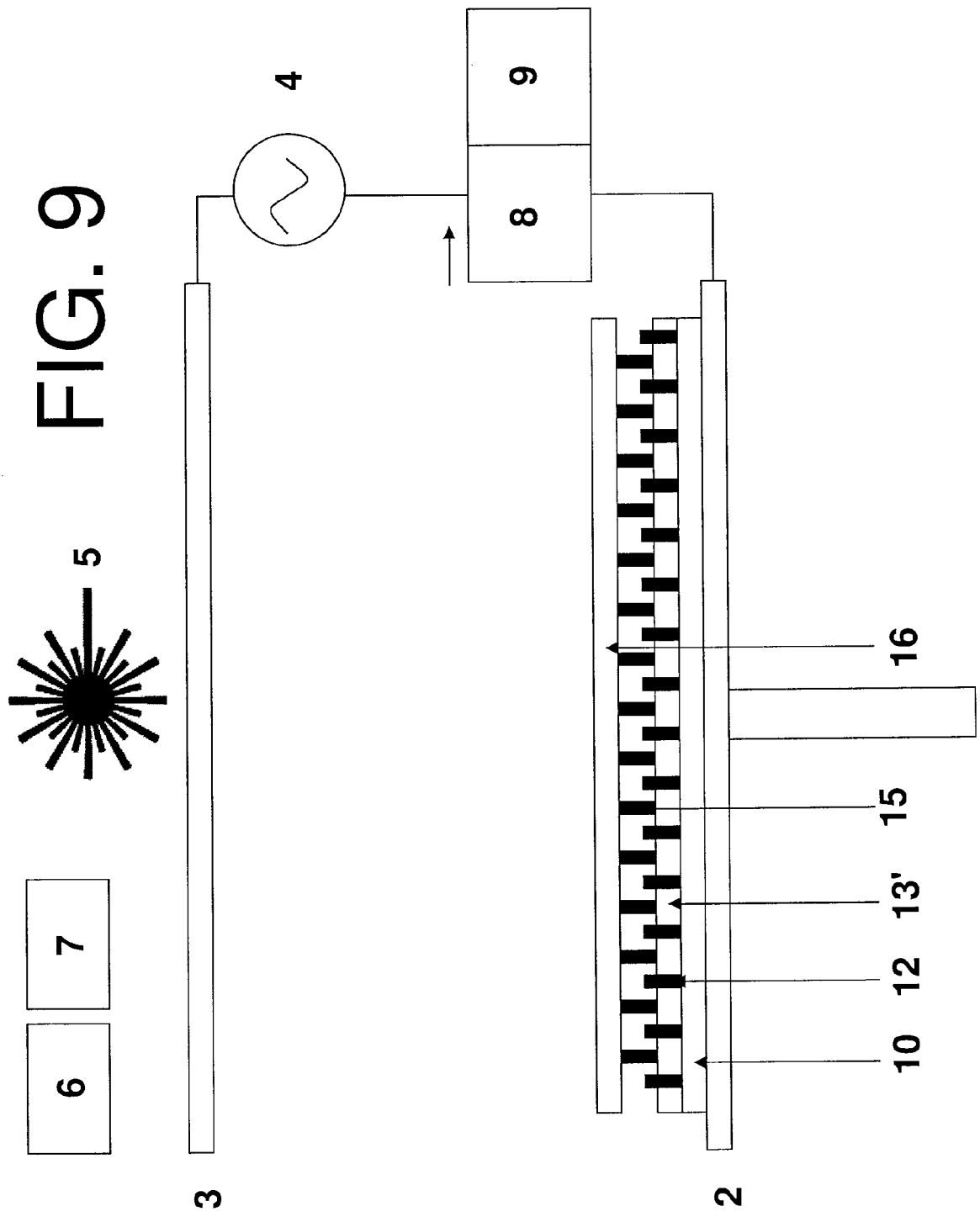

As shown in FIG. 9, the negative plasma source 2 is lowered again and a further layer 16 of polymer powder deposited on top of the layer of nanofibres 15.

Figure 10:
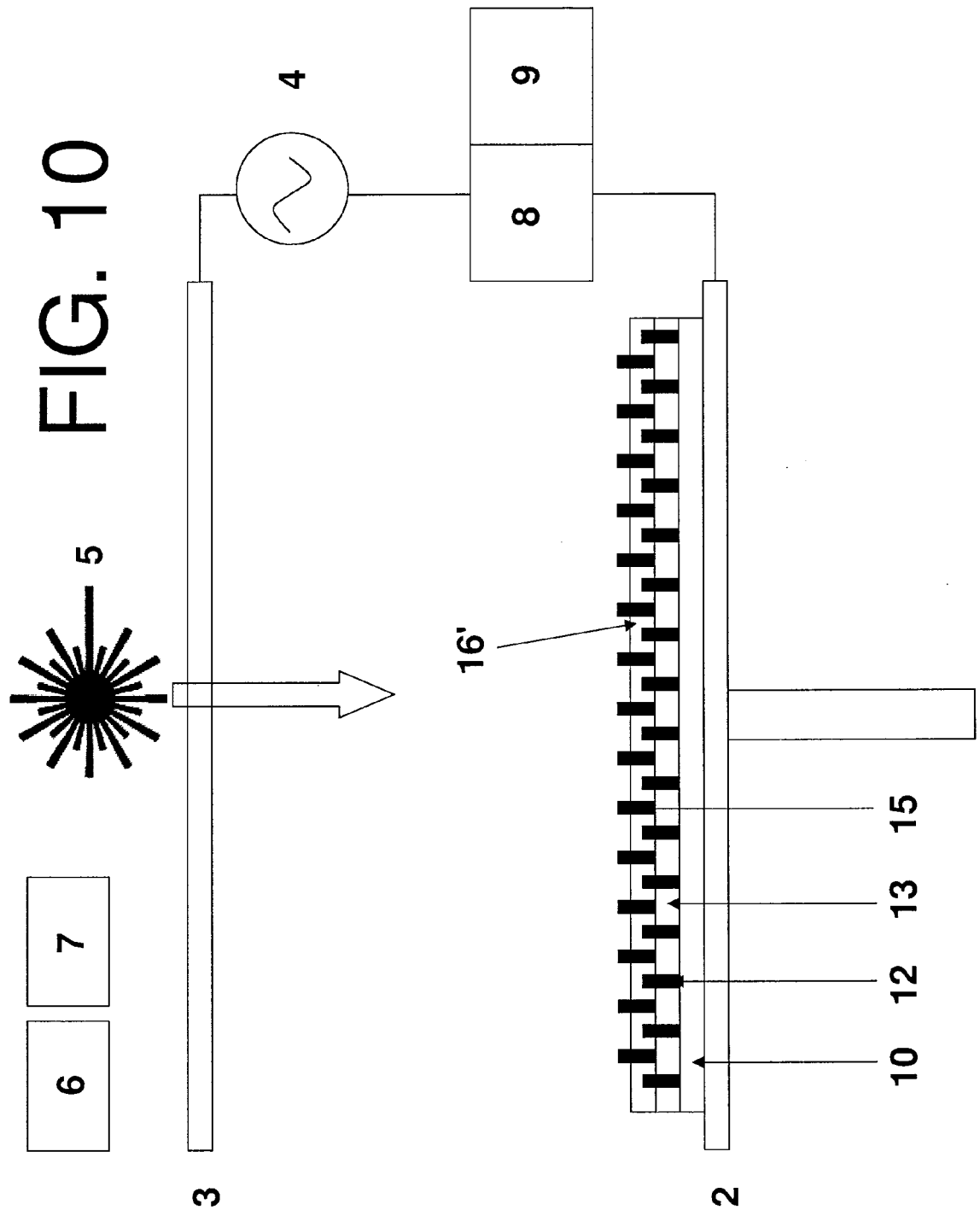

As shown in FIG. 10, the layer 16 is then consolidated by the laser 5 to form a consolidated layer 16'.

The process is then repeated as required, with each layer of nanofibres being selectively impregnated to form a cross-section with a desired two-dimensional shape and size. Once the structure has been formed, unconsolidated powder is removed, leaving an element with a desired three dimensional shape.

In the embodiment described above, a respective layer of catalyst particles 11,14 is deposited for each layer of fibres. In an alternative embodiment, the layer of catalyst particles 11 may be re-used to catalyse a succession of layers of fibres which grow end-to-end, instead of growing as a succession of discrete fibres with the overlapping configuration shown in FIG. 8.

Optionally the printing head 9 may be modulated selectively so as to deposit each layer of colloid drops with a desired shape and/or packing density. This enables each layer of nanotubes to be grown with a different shape and/or packing density. Optionally the packing density of the colloid drops (and hence the packing density of the nanofibres) may also vary across the layer (in the width and/or length direction) as well as varying between layers.

Instead of depositing the matrix powder with a hopper 8, the layers of matrix powder may be applied by a roller or other feed system which spreads the layer across the substrate.

FIGS. 11-17 show an additive layer manufacturing system for manufacturing a composite with a thermosetting epoxy resin matrix (instead of the thermoplastic matrix used in the apparatus of FIGS. 1-10). The system shown in FIGS. 11-17 incorporates all of the elements of the system of FIG. 1 (except the hopper 8) but these elements are not shown in FIGS. 11-17 for purposes of clarity.

Figure 11:
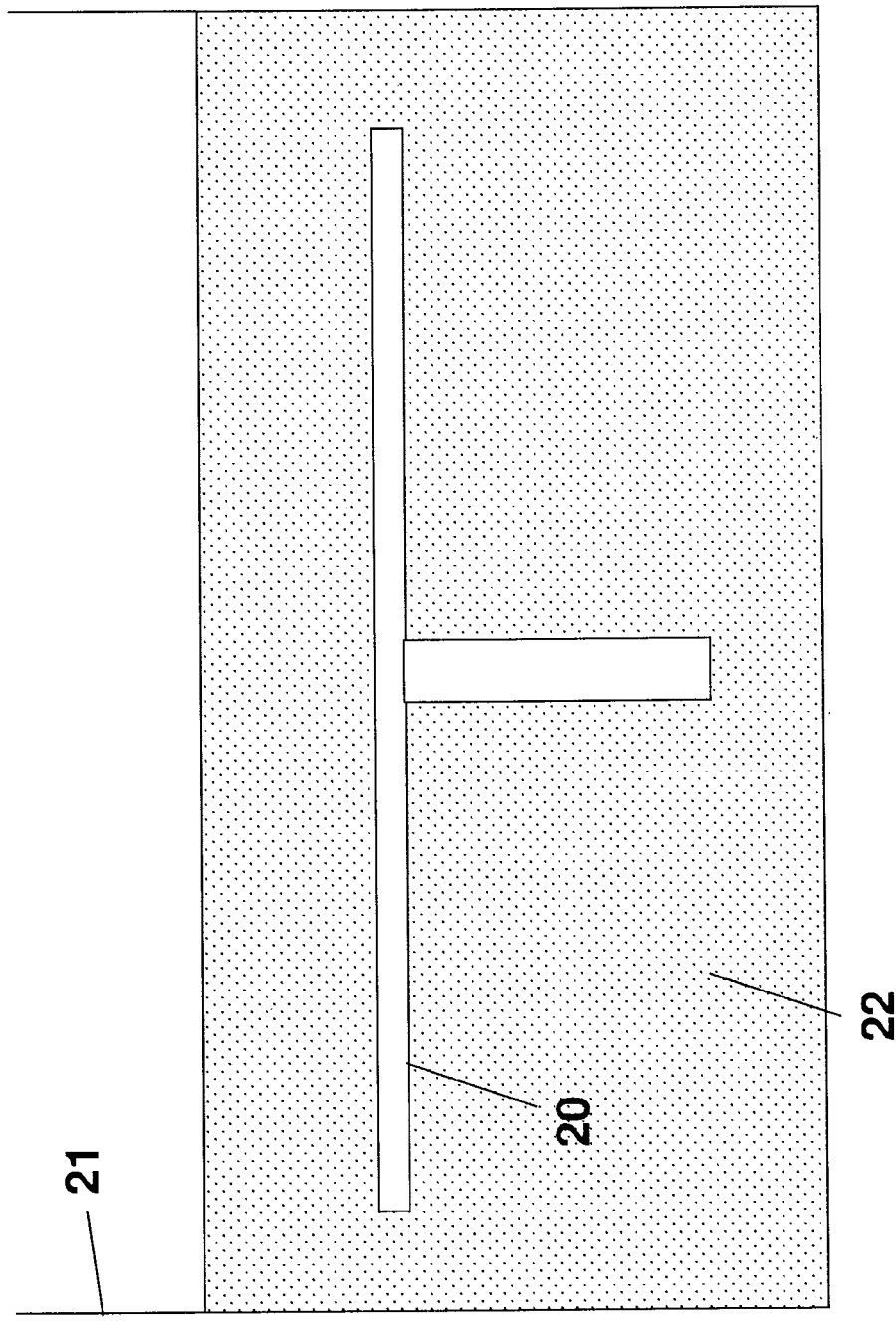
FIGS. 11-17 show various steps in the manufacture of a thermosetting matrix composite material.
Figure 12:
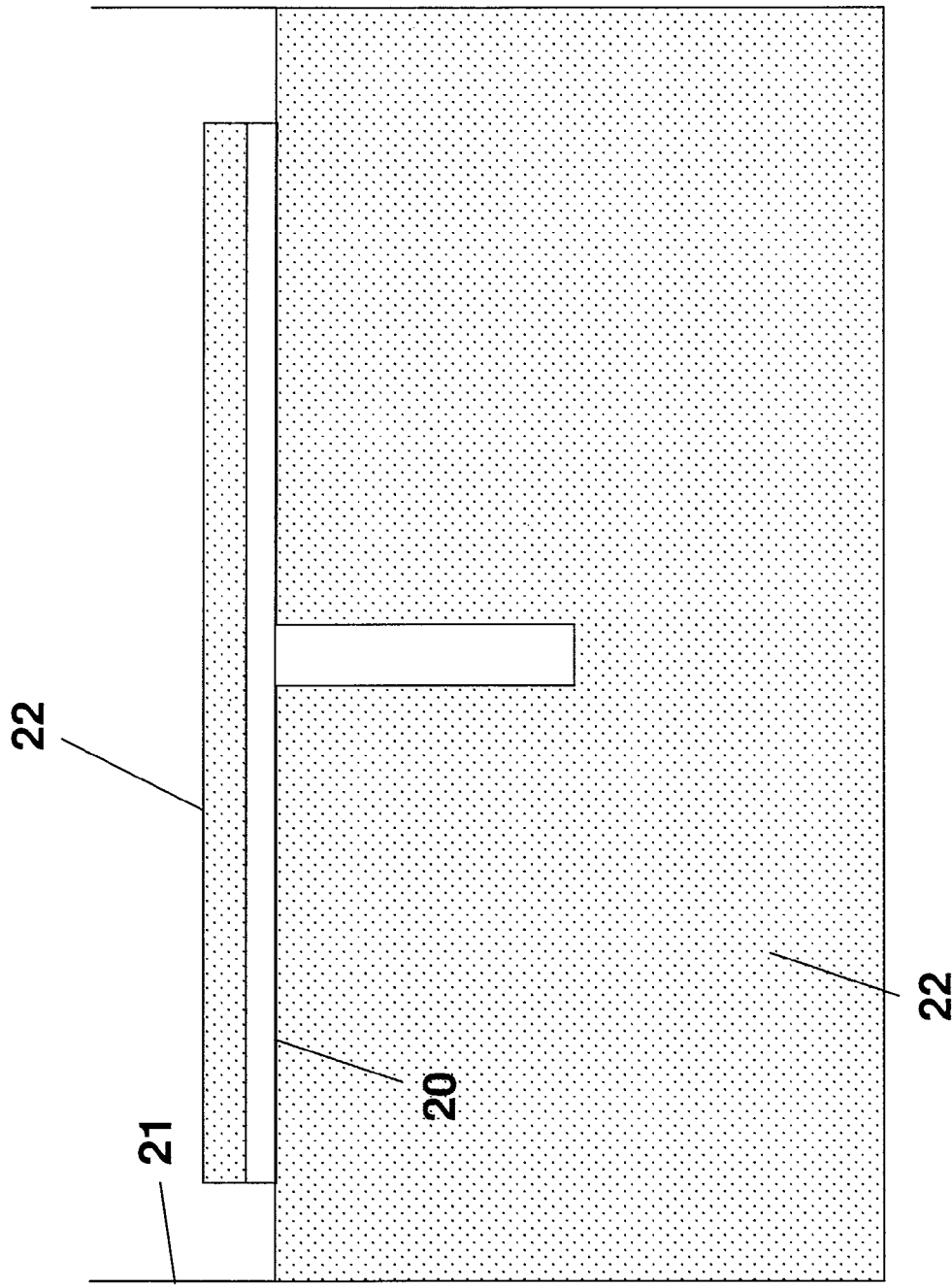
Figure 13:
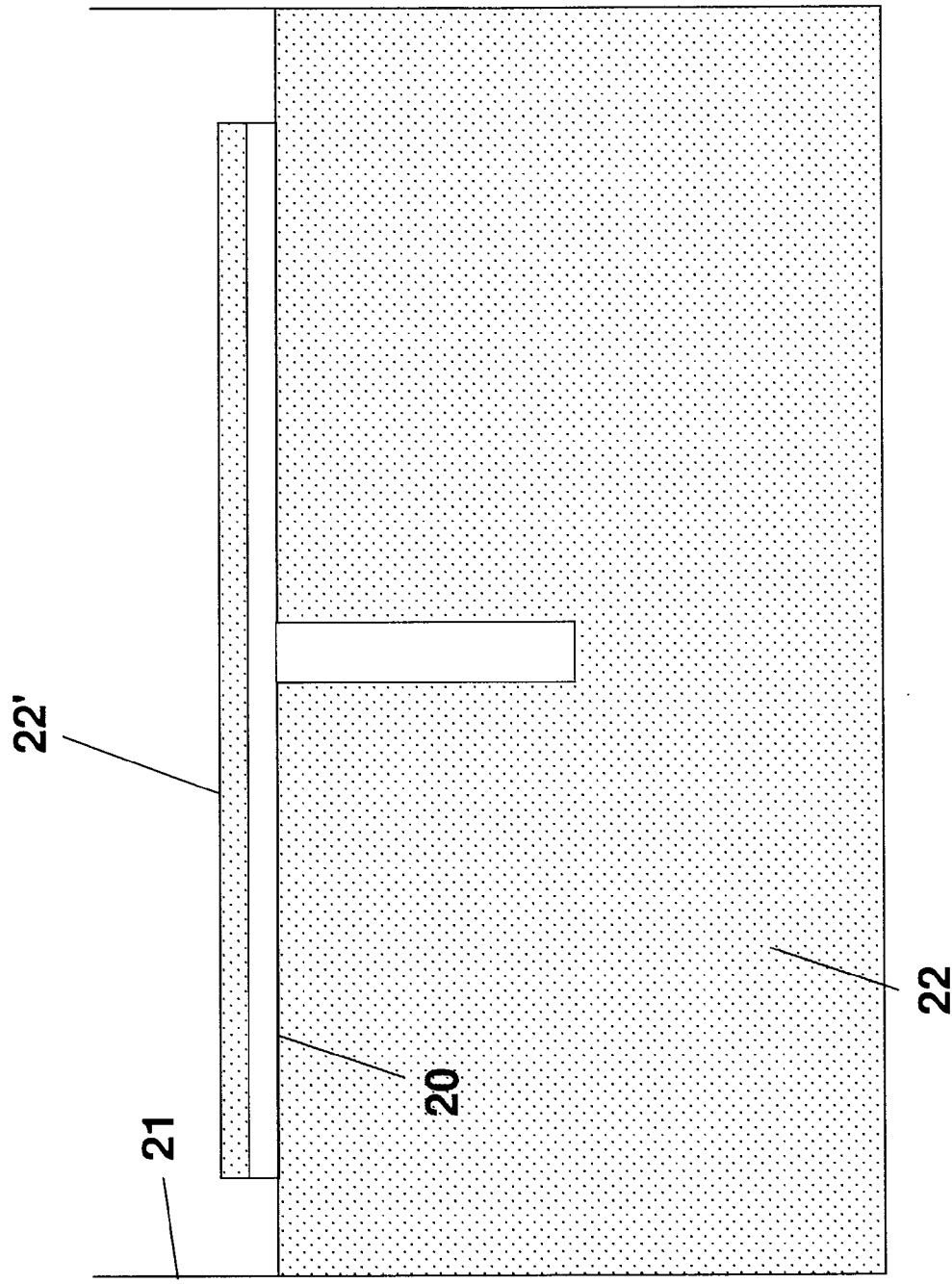

In a first process step shown in FIG. 11, a platform 20 is immersed in a bath 21 of liquid epoxy resin 22. The platform is then lifted up to a position just above the surface of the bath 21 as shown in FIG. 12 in which a mound 22 of resin is supported by the platform 20. A doctor blade (not shown) wipes across the mound 22 to leave a uniformly thick layer 22' of resin shown in FIG. 13. A laser (not shown) is then turned on and scanned across the layer 22' to cause the resin to cure in a desired shape.

Figure 14:
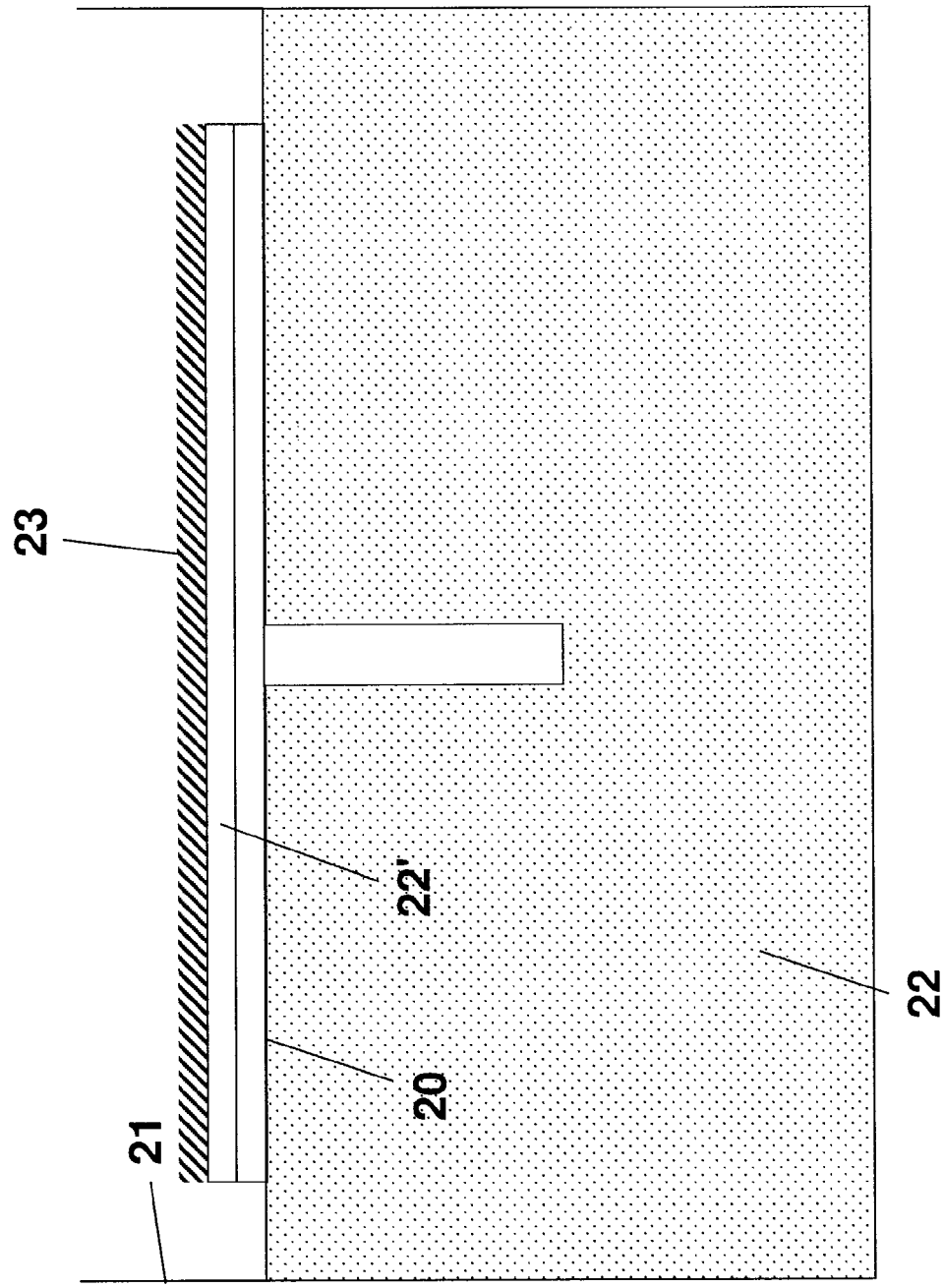

A printing head (not shown) is then moved across the layer 22' to deposit an array of catalyst particles (not shown). A carbonaceous feed stock is then introduced into the process chamber, and a plasma from a plasma source (not shown) is applied at an angle to the layer 22 to cause the growth of a layer of nanofibres 23, aligned with the direction of the electromagnetic field. An angle of 45° is shown in FIG. 14, although this angle may be as low as 5° if required.

Figure 15:
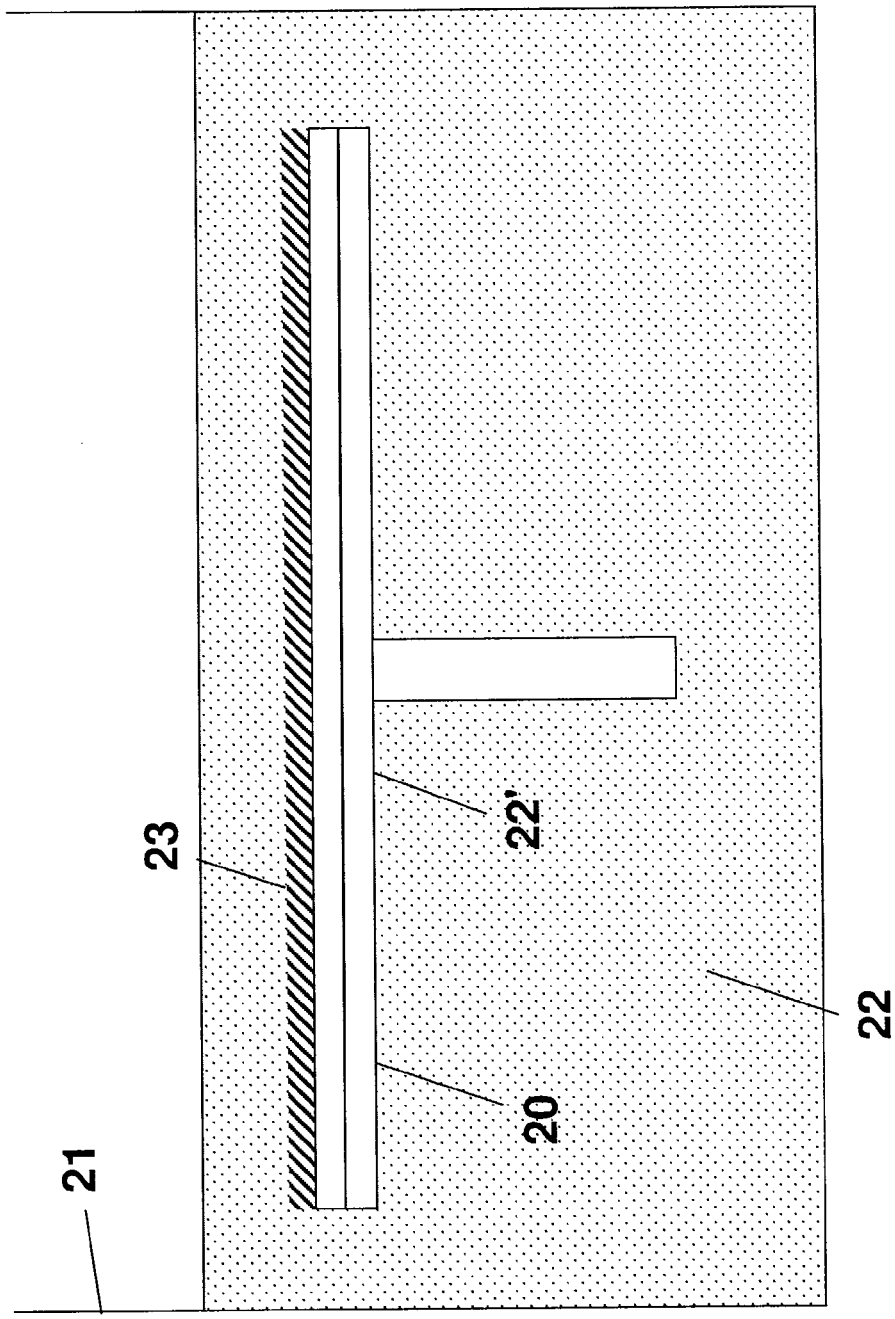

Once nanofibres 23 of a suitable length have been grown, the plasma power source and gas supply are turned off, inert gas in the chamber is purged, and the platform 20 is lowered as shown in FIG. 15.

Figure 16:
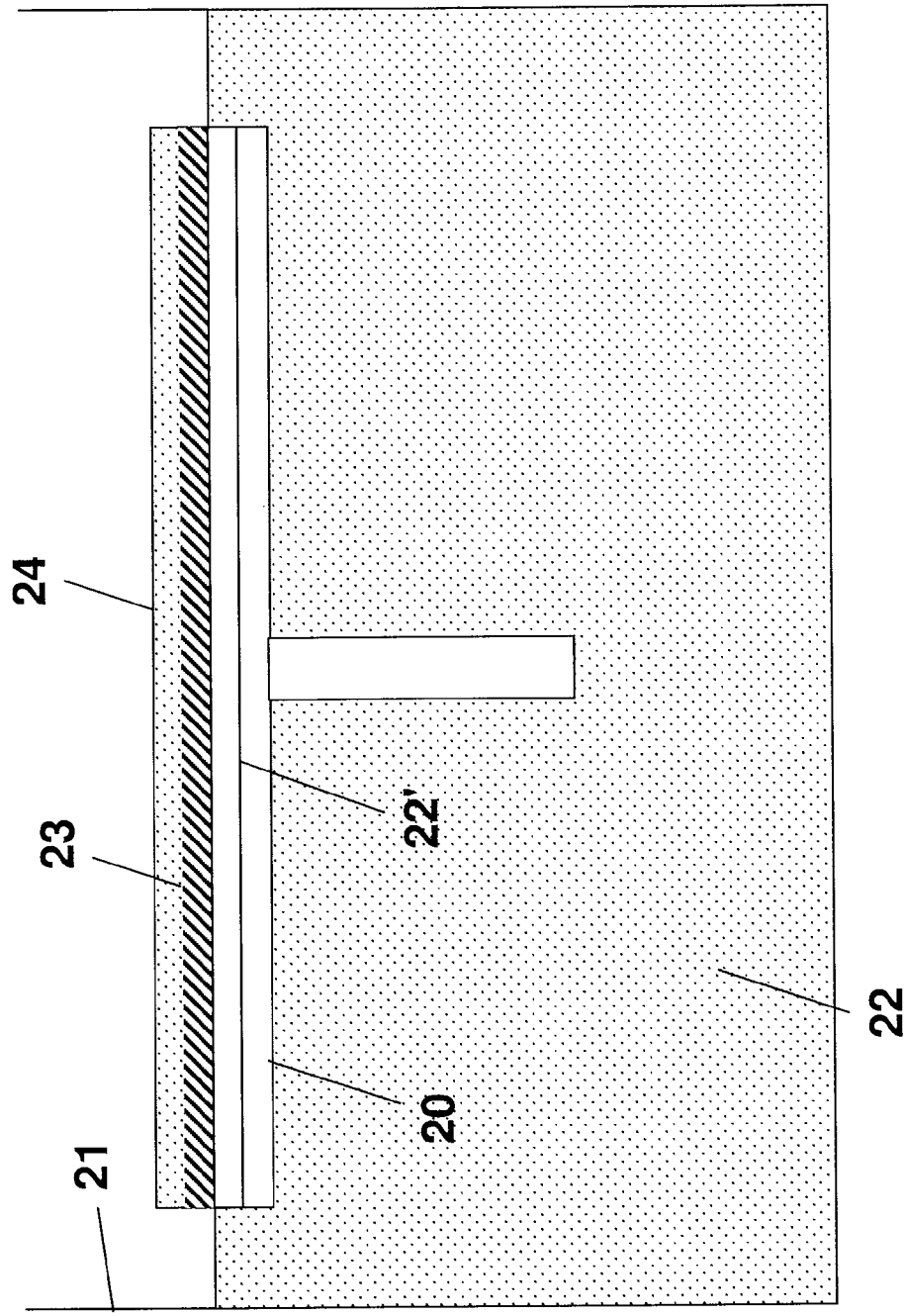
Figure 17:
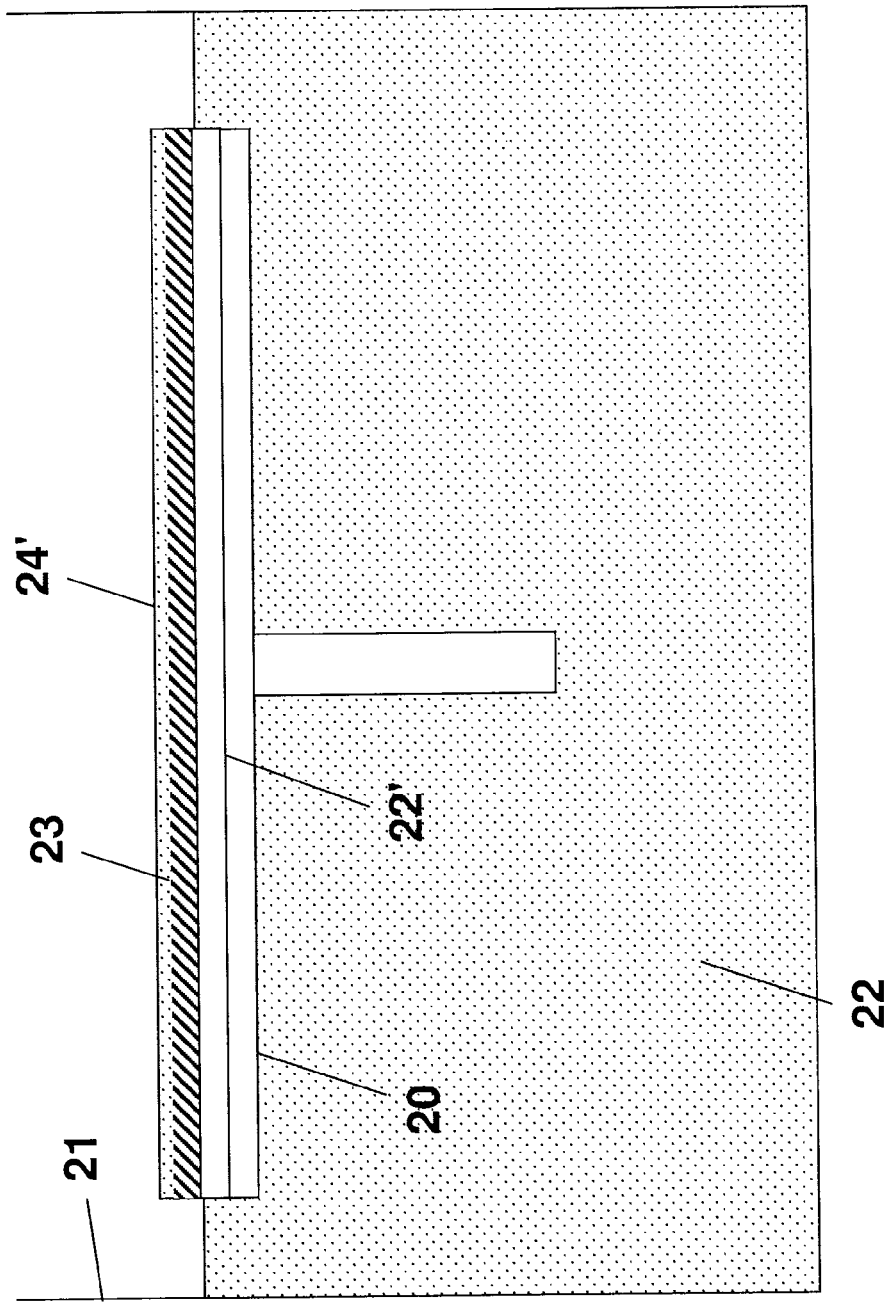

The platform 20 is then lifted up to the position just above the surface of the bath 21 shown in FIG. 16 in which a mound 24 of resin impregnates the layer of nanofibres 23. The doctor blade then wipes across the mound 23 to form a uniformly thick layer 24' of resin shown in FIG. 17. The laser is then turned on and scanned across the layer 24' to cause the resin to cure in a desired shape. Note that the layer 24' is shown in FIG. 17 above the layer of nanofibres 23, but in practice the layer 24' may be made sufficiently thin such that after curing it only impregnates the matrix through a lower part of its thickness, in a similar manner to the layer 13' shown in FIG. 6, thus giving partial overlap with the next layer of nanofibres.

The process is then be repeated further to form a bulk material.

It should be noted that FIGS. 1-17 are not to scale, and thus the relative dimensions of the various elements may vary significantly from those shown.

In a further embodiment of the present invention, the hopper 8 is filled with a powder of catalytic matrix material which catalyses the growth of the next layer. For instance the powder in the hopper 8 may be a stainless steel powder (that is, an Fe—C alloy with a minimum of 10.5 wt % Cr) or a Co—Cr alloy powder. The use of a catalytic powder means that the printing head 9 for printing catalyst particles can be omitted, along with the associated method steps. Control of alignment and orientation layer-by-layer would be easily maintained as the build progressed as the metallic part could in many cases function as an extended electrode.

In a further embodiment of the present invention, each reinforcement layer may be impregnated by vapour or spray deposition of a series of layers of matrix material. For instance each reinforcement layer may be impregnated by chemical vapour deposition, physical vapour deposition or plasma spray deposition. FIGS. 18-27 give a specific example showing impregnation by chemical vapour deposition of pyrolytic carbon.

The apparatus shown in FIGS. 18-27 is housed within a process chamber 101. A negative plasma source electrode 102 and a positive plasma source electrode 106 are connected by a power source 107 and electrical connector 108. A gas supply 104 can be turned on and off to supply a pre-heated process gas to the chamber, such as $CH_4/H_2$. The gas supply 104 can also supply an inert gas such as $N_2$. An exhaust for the chamber is indicated at 105.

Figure 18:
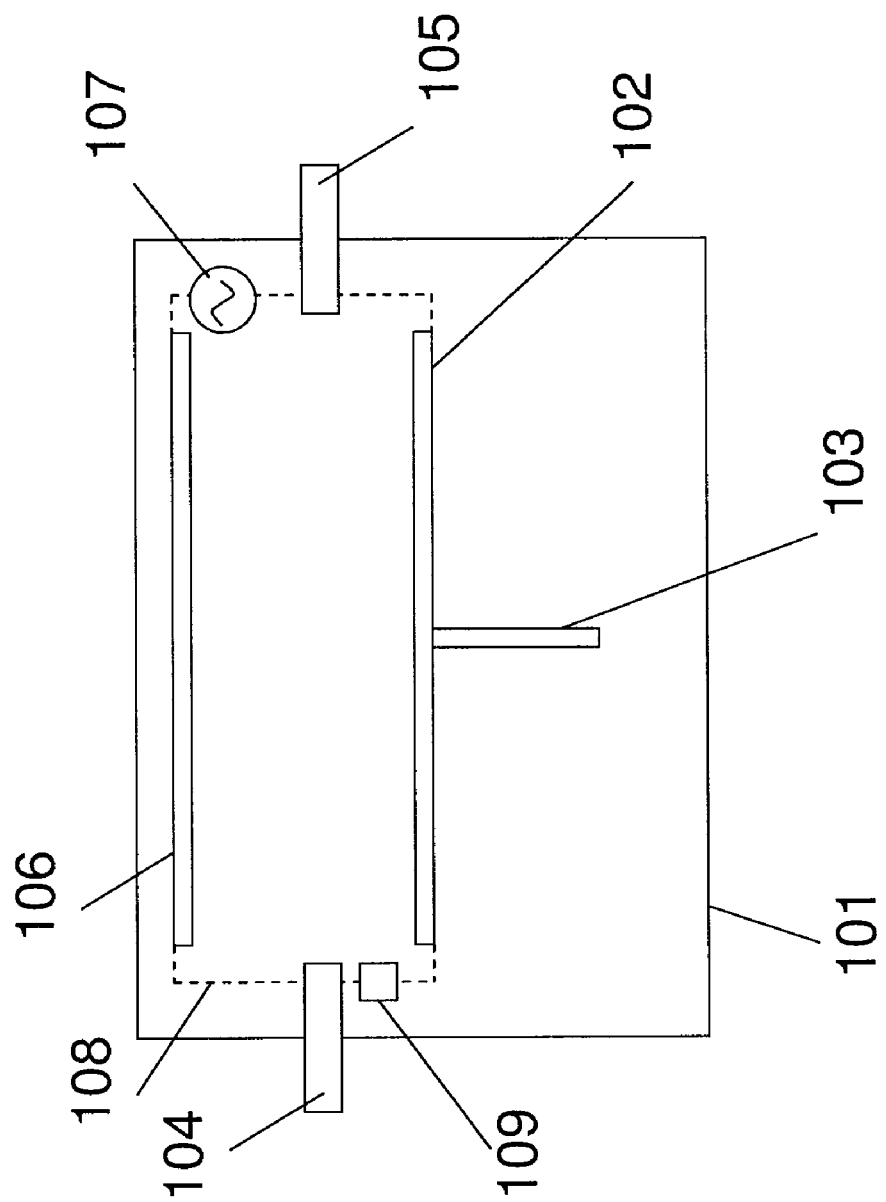
FIGS. 18-27 show various steps in the manufacture of a carbon matrix composite material.

A cooled ink-jet printing head 109 is mounted on a transport mechanism (not shown) which can move the printing head 109 from left to right in FIG. 18 (that is, from one end of the negative plasma source 102 to the other). A transport mechanism 103 is provided for driving the negative plasma source 102 up and down.

FIGS. 18-27 are side views of the apparatus, and thus do not show the third (width) dimension out of the plane of the figures. However, the electrodes 102, 106 and printing head 109 will extend across the width of the apparatus.

Figure 19:
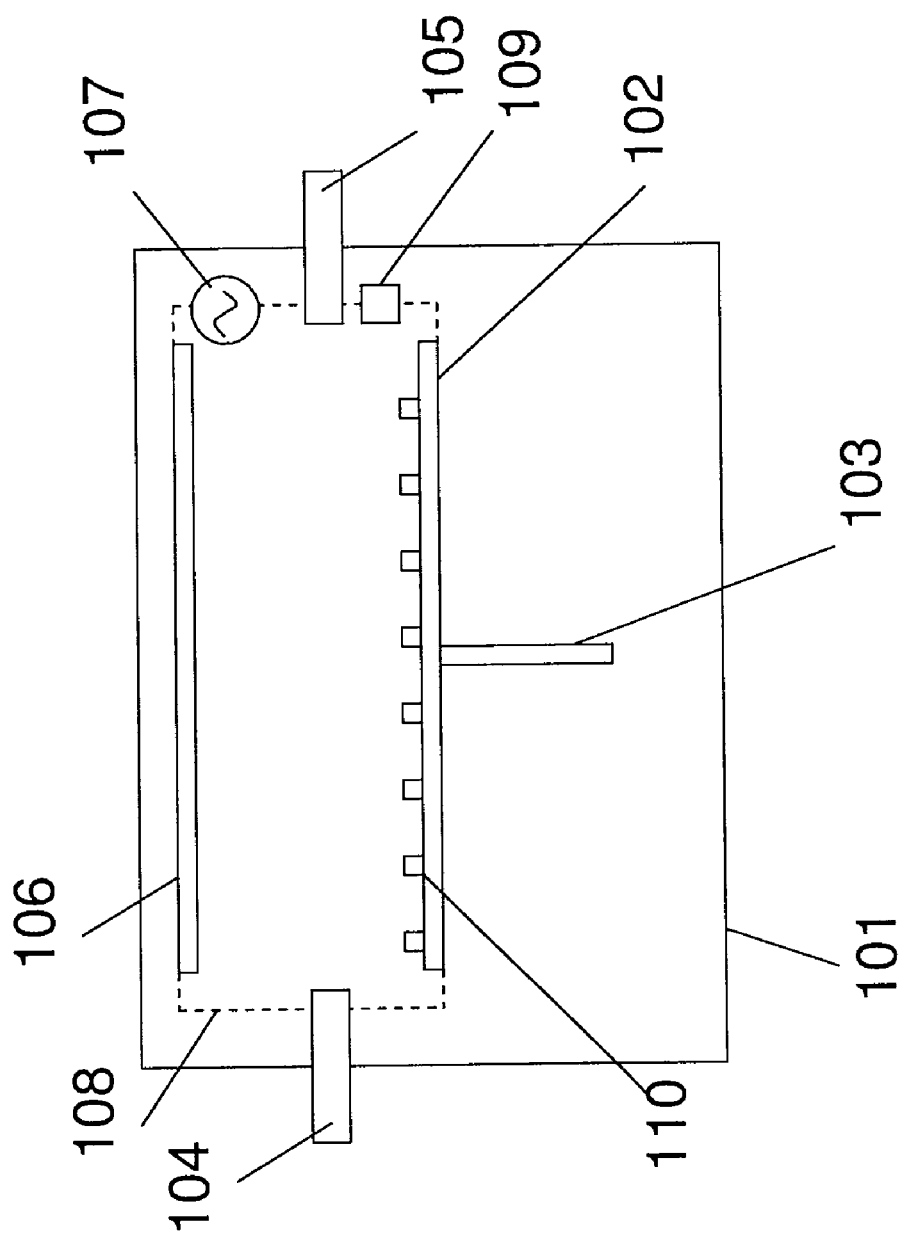

In a first process step shown in FIG. 19 the printing head 109 is moved across the electrode 102 to deposit an array of catalyst particles 110. The printing head 109 and deposition method is identical to the method described above with reference to FIG. 3, so will not be described again here.

Figure 20:
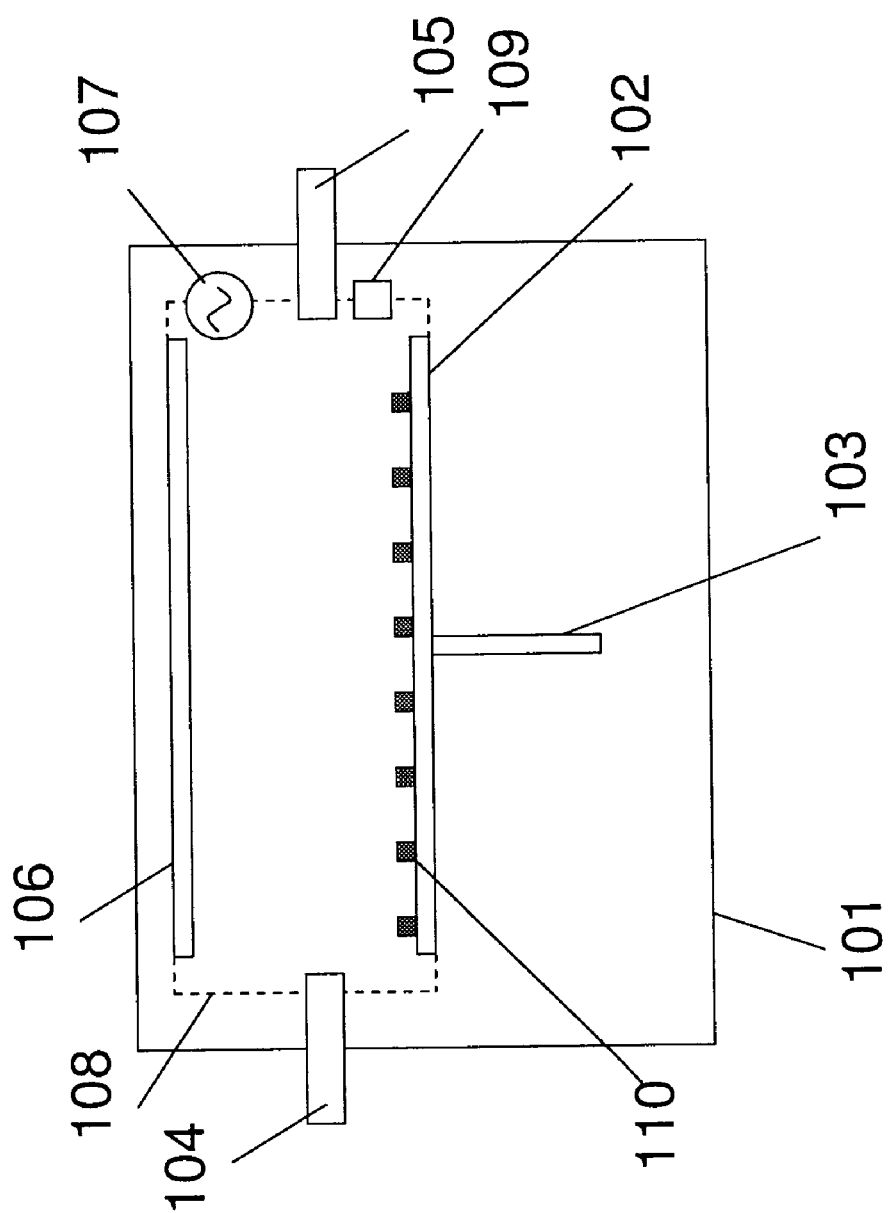
Figure 21:
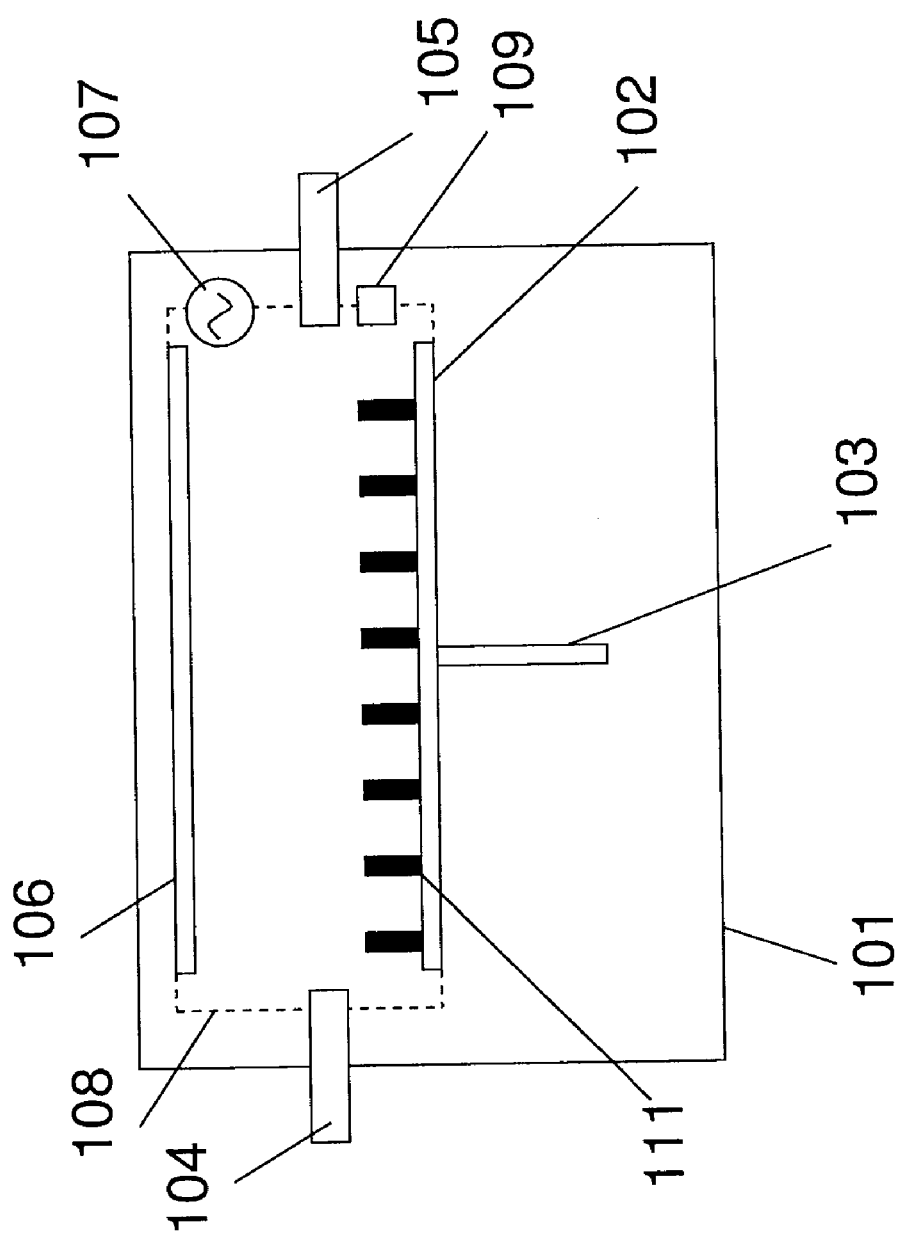

In a second process step shown in FIG. 20 the catalyst material is conditioned through a process of spherulisation and/or oxidation and/or reduction, depending on the catalyst type. This conditioning is performed by the combination of heating and supply of an oxidising and/or reducing gas from supply 104, depending on the catalyst type In a third process step shown in FIG. 21, carbonaceous feed stock is introduced from the gas supply 104 and the power source 107 is turned on to generate a plasma between the electrodes. This causes the in-situ growth of a layer of nanofibres 111, aligned with the direction of the electromagnetic field between the electrodes. Other gases could also be added, such as hydrogen or sulphur, to control the details of the process in both the matrix and reinforcement growth phases.

Figure 22:
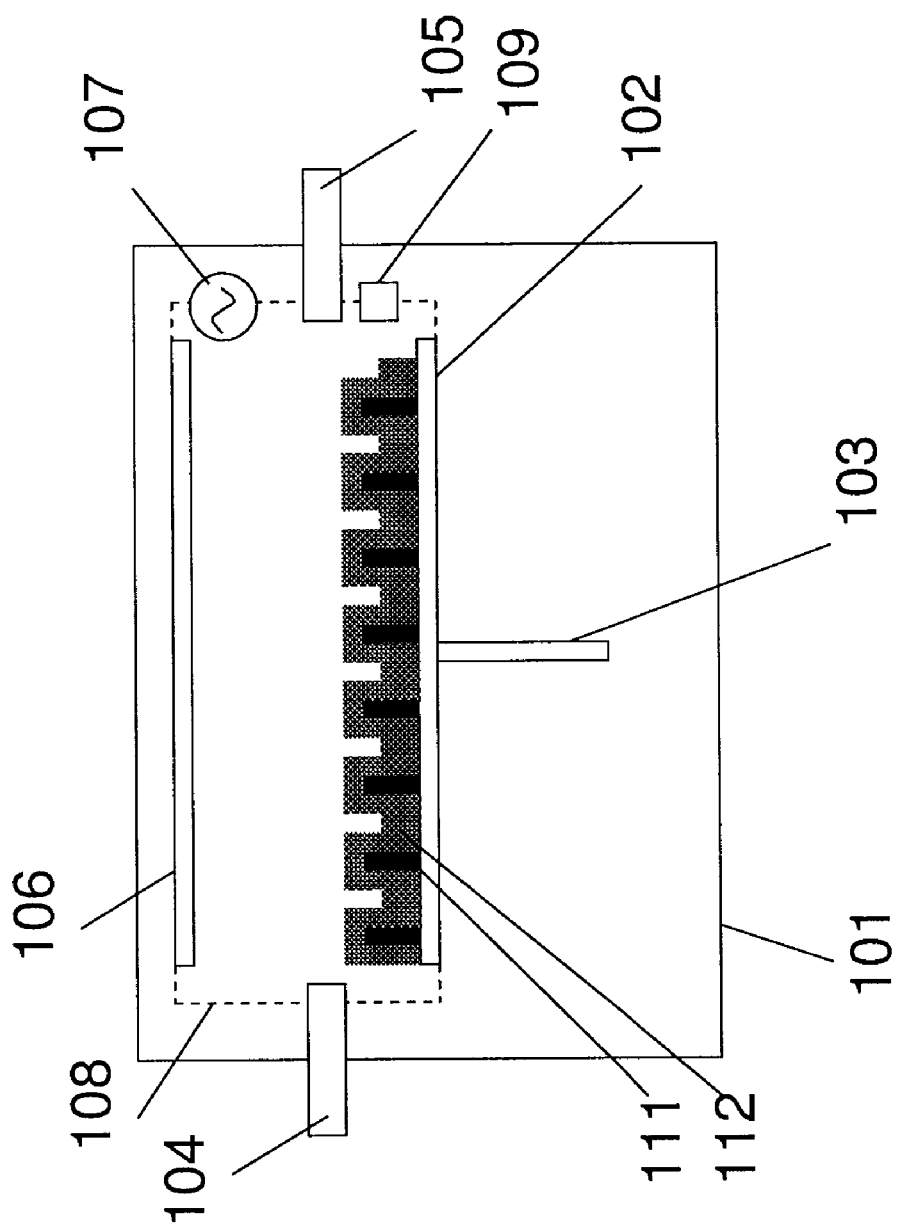

Once nanofibres 111 of a suitable length have been grown, the carbon nanofibre growth is then stopped and the deposition of a substantially pure Carbon matrix phase is initiated by altering the gas mixture (more carbon rich), the feed rate (increased) and the temperature (increased) to form pyrolytic carbon 112 as shown in FIG. 22.

The layer of pyrolytic carbon infiltrates the voids between adjacent carbon nanofibres 111, or between adjacent bunches of carbon nanofibres 111. Varying the power to the electrodes, and therefore the degree of plasma-enhancement, can control the rate of deposition and directionality.

The deposition of the matrix phase 112 is halted by ceasing supply of carbonaceous gas or by decreasing the temperature. The exact thickness and uniformity of the carbon matrix phase deposited is of utmost importance, in order to facilitate the growth of the next layer of reinforcements so that there is overlap in the z-axis between adjacent reinforcement layers. Preferably the aspect ratio of the overlap would be greater or significantly greater than 100.

Figure 23:
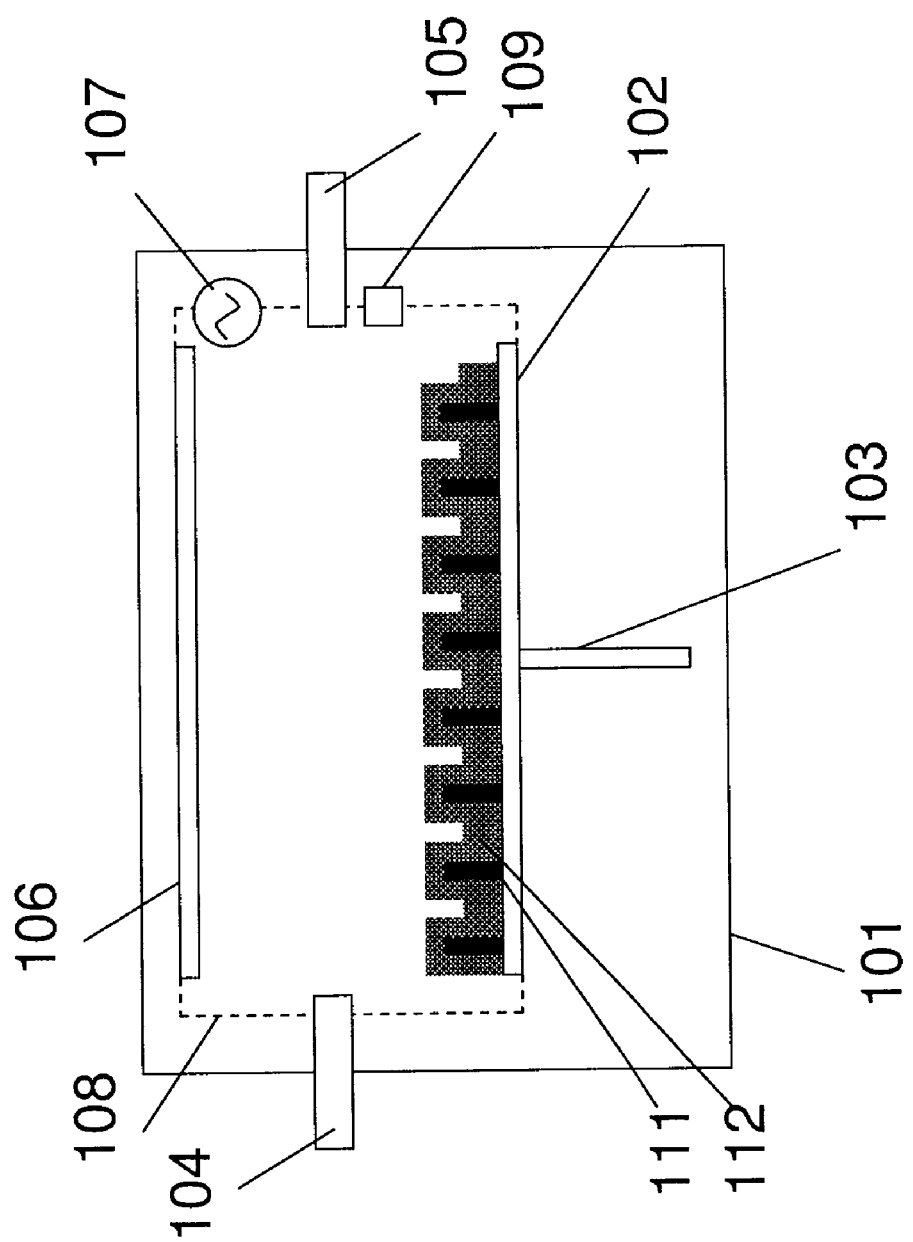
Figure 24:
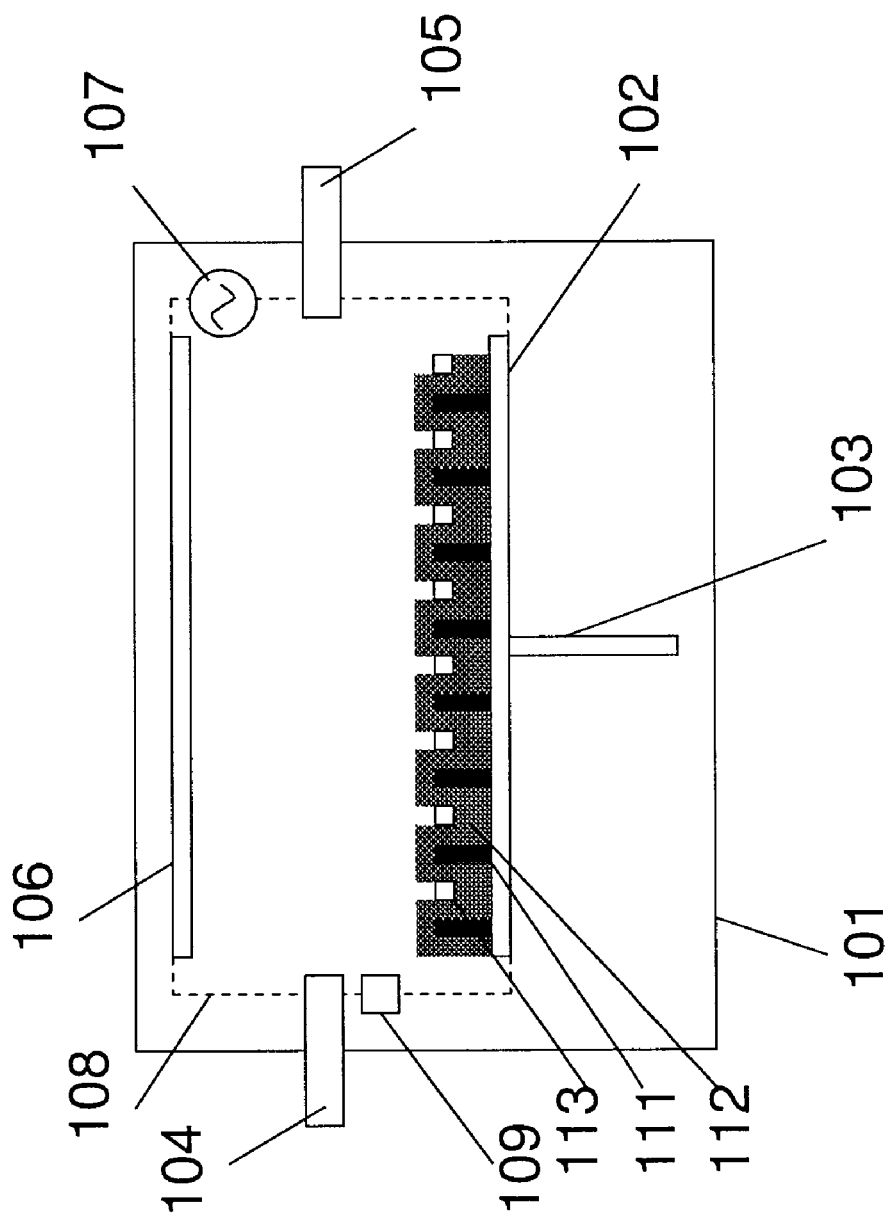
Figure 25:
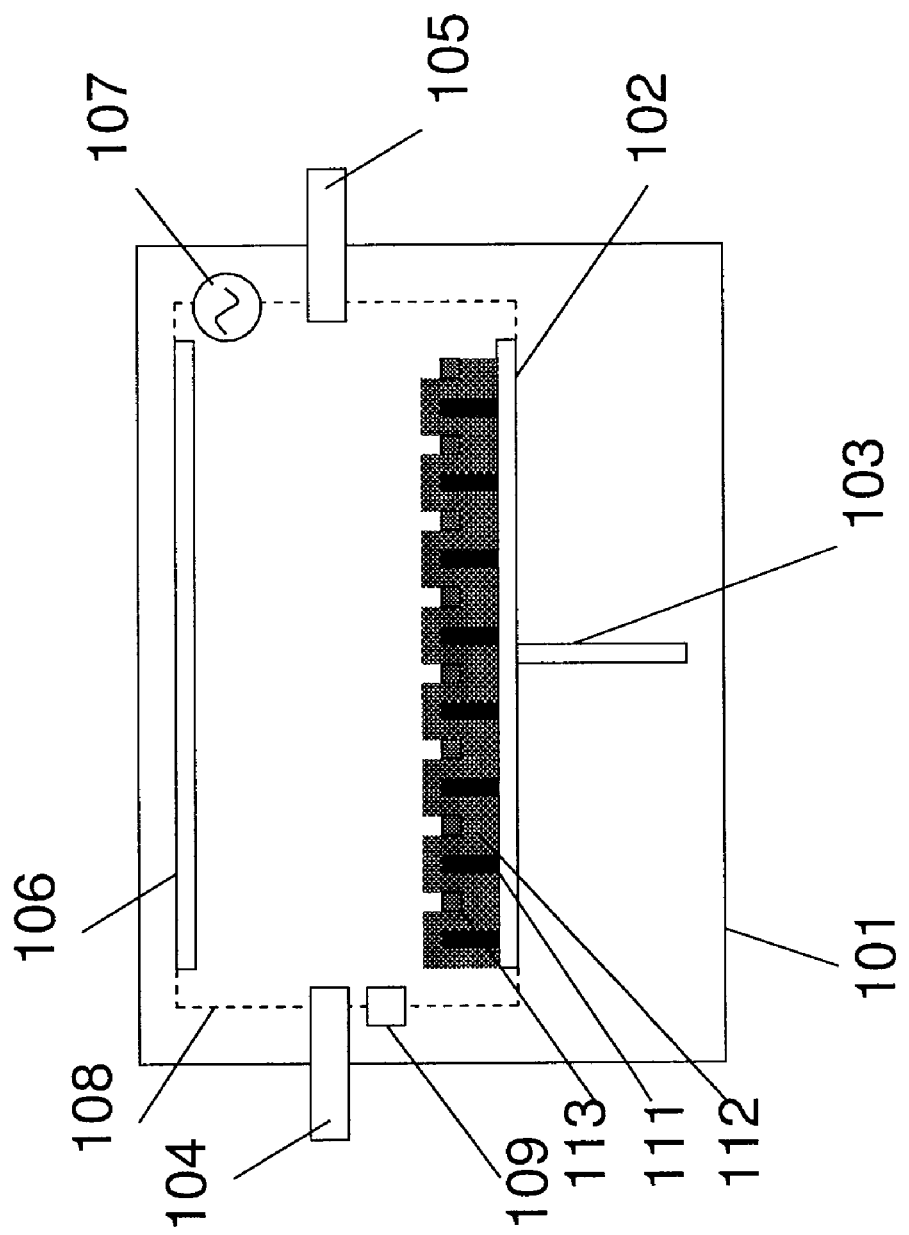
Figure 26:
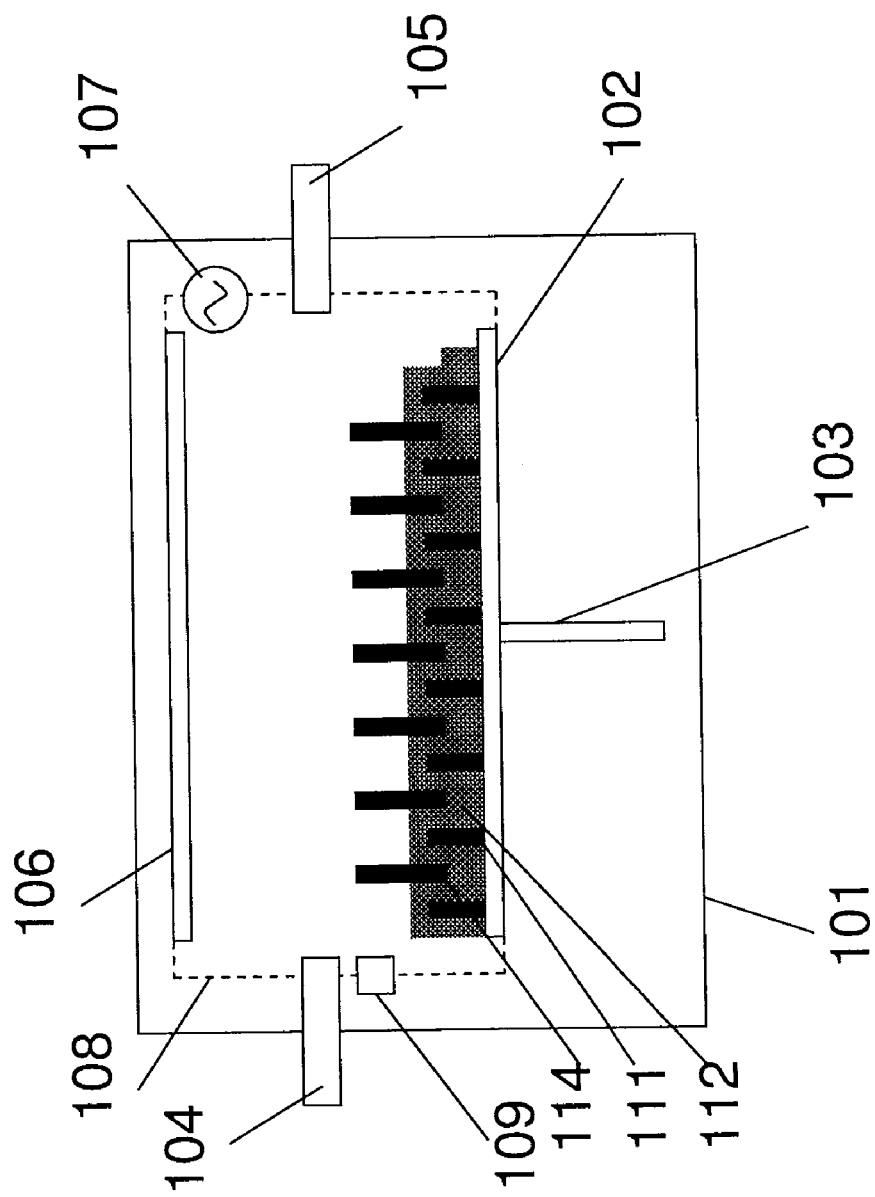
Figure 27:
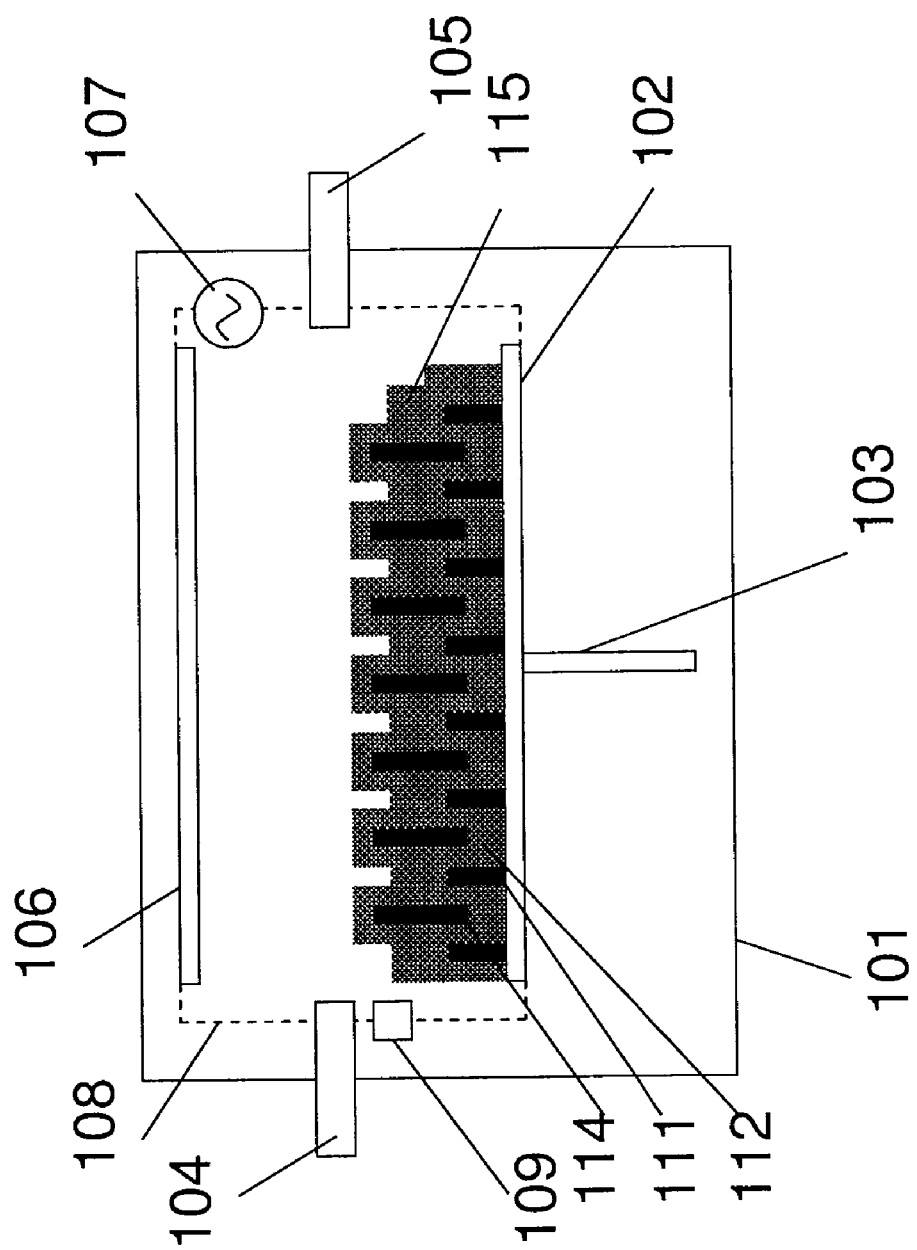
Figure 28:
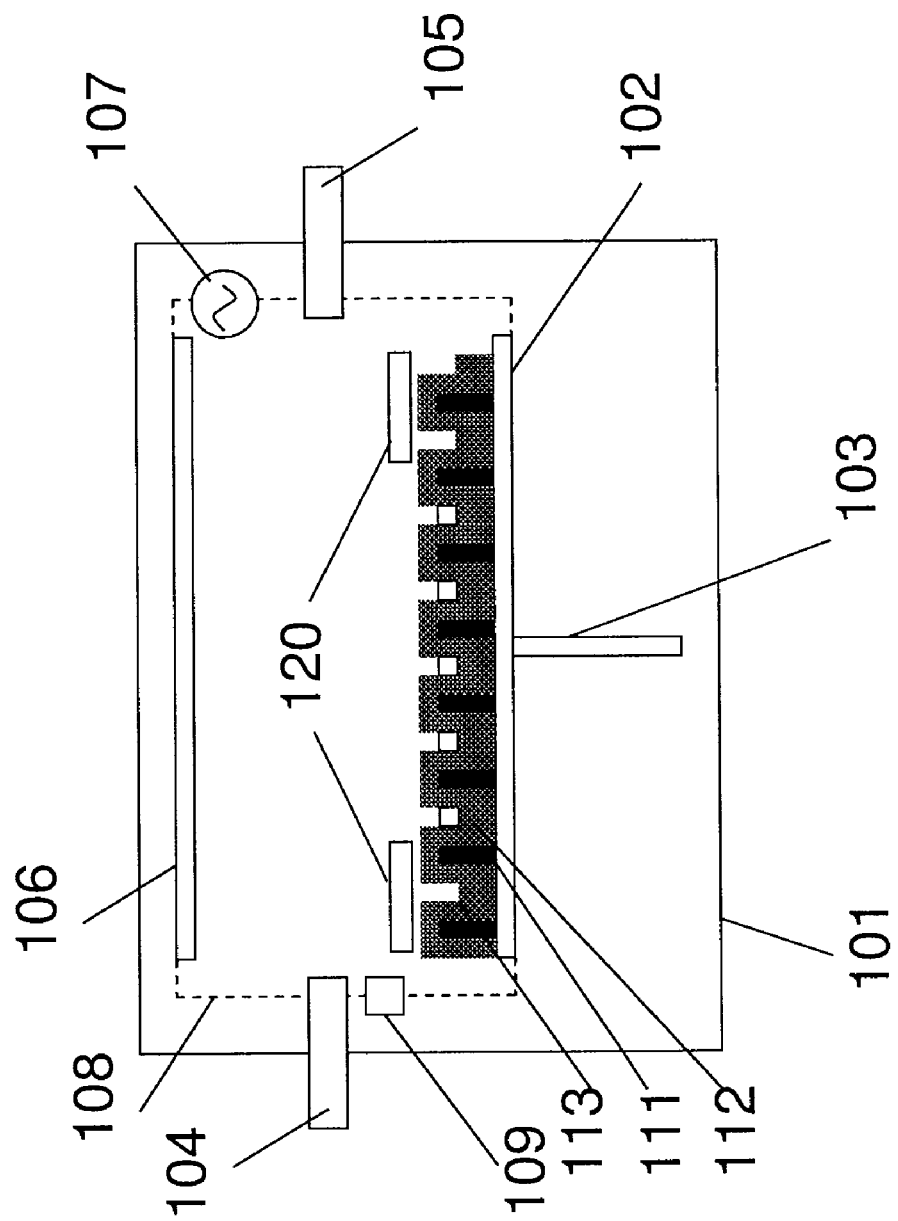
Figure 29:
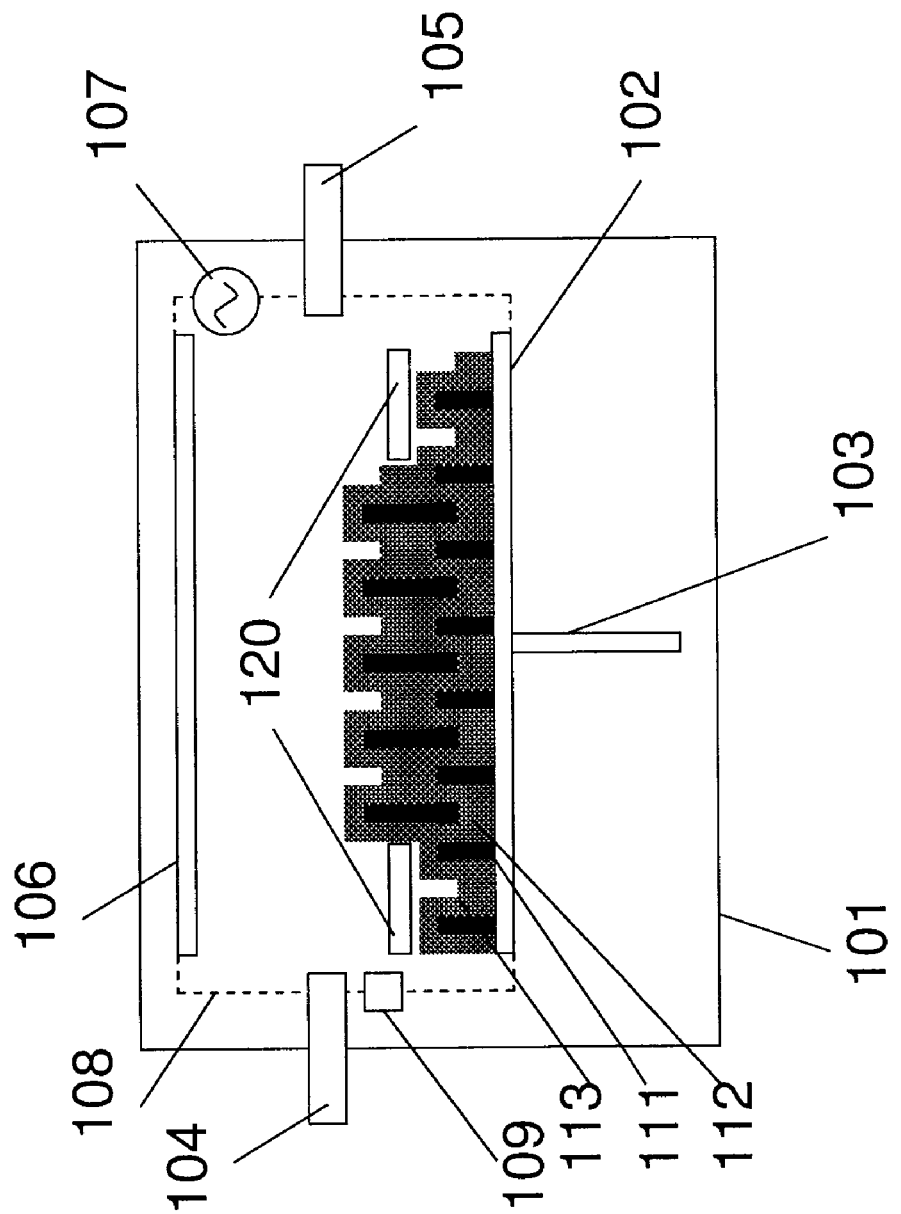
Figure 30:
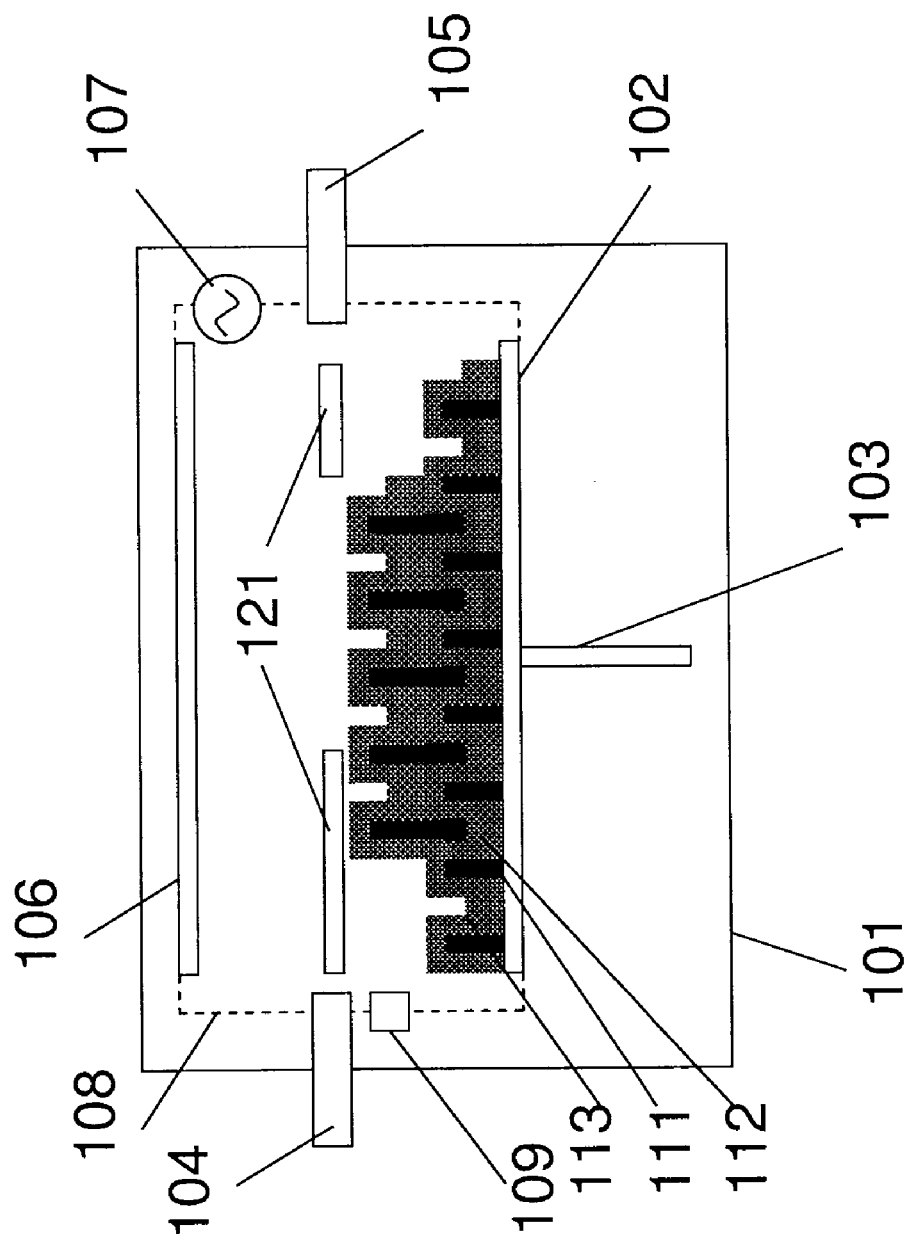

In FIG. 23, the platform 102 is lowered and in FIGS. 24-27 the process steps are repeated to build up a second layer 114 of nanofibres impregnated with a pyrolytic carbon matrix 115. The process steps can then be repeated indefinitely to build up a series of layers of nanofibres each impregnated with a substantially pure carbon matrix. FIGS. 28-30 show a modification of the process of FIGS. 18-27, in which successive layers are masked in order to build up a net-shape part. FIG. 28 shows the deposition of a layer of catalyst particles 113 (as in FIG. 24) but in this case the substrate is masked by a mask 120 so that catalyst particles are only deposited in the un-masked area. The mask 120 remains in place during formation of the next layer as shown in FIG. 29. Then when the next layer is formed, the mask 120 is replaced by a new mask 121 with a different shape as shown in FIG. 30. Alternatively it may be possible to change the shape of the mask 120 to give a different shape to successive layers, instead of replacing the mask 120 with a different mask 121.

In a further alternative, instead of depositing the matrix phase by chemical vapour deposition as in FIGS. 18-30, the matrix phase may be deposited by a spraying technique such as plasma spraying. In the case of plasma spraying the material to be deposited—typically as a powder, sometimes as a liquid, suspension or wire—is introduced into a plasma jet, emanating from a plasma torch. In the jet, where the temperature is of the order of 10,000K, the material is melted and propelled towards the substrate. There, the molten droplets flatten, rapidly solidify and form a deposit. The use of a spraying technique such as plasma spraying may enable a net-shape part to be formed without masking because the spray can be targeted only to selected areas of the substrate to give the desired shape for each layer.

Although the invention has been described above with reference to one or more preferred embodiments, it will be appreciated that various changes or modifications may be made without departing from the scope of the invention as defined in the appended claims.

The invention claimed is:

1. A method of manufacturing a composite material, comprising:
   growing a first reinforcement layer of reinforcement elements to a thickness, $t_1$, in-situ, wherein the reinforcement elements are formed from a reinforcement material, and wherein the first reinforcement layer of grown reinforcement elements is arranged to have unoccupied space between adjacent reinforcement elements;
   impregnating at least a portion of the unoccupied space of the first reinforcement layer with a first matrix layer comprising a matrix material, wherein the first matrix layer extends continuously over a thickness $t_m$, and over a substantial part of the area of the first reinforcement layer, and wherein the thickness $t_1$ is greater than thickness $t_m$ so that part of the thickness of the first reinforcement layer is not impregnated by the first matrix layer, and thereafter
   growing a second reinforcement layer of reinforcement elements, in-situ, wherein the reinforcement elements are formed from a reinforcement material, and wherein the second reinforcement layer of grown reinforcement elements is arranged to have unoccupied space between adjacent reinforcement elements, and thereafter
   impregnating at least a portion of the unoccupied space of the second reinforcement layer with a second matrix layer comprising a matrix material.

2. The method of claim 1 further comprising forming at least one layer of catalyst particles to catalyse the growth of the at least one of the layers of reinforcement elements.

3. The method of claim 2 wherein the forming at least one layer of catalyst particles comprising forming a respective layer of catalyst particles for each layer of reinforcement elements.

4. The method of claim 3 further comprising forming at least two of the layers of catalyst particles with different shapes.

5. The method of claim 2 further comprising forming at least two of the layers of catalyst particles with different catalyst particle packing densities.

6. The method of claim 2 further comprising forming at least one of the layers of catalyst particles with a catalyst particle packing density which varies across the layer.

7. The method of claim 1 further comprising heating the matrix during impregnation.

8. The method of claim 7 wherein the at least of the layers of reinforcement elements is impregnated by:
   depositing a layer of the matrix material on the at least one of the layers of reinforcement; and
   heating at least part of the layer of matrix material.

9. The method of claim 8 wherein the layer of the matrix material is a powder.

10. The method of claim 9 wherein the layer of the matrix material comprises a catalytic matrix material which catalyses the growth of a next layer of the layers of reinforcement elements.

11. The method of claim 9 wherein the layer of the matrix material comprises a metal powder.

12. The method of claim 9 wherein the layer of the matrix material comprises Iron, Nickel, Cobalt or an alloy thereof.

13. The method of claim 1 wherein the matrix is a metal.

14. The method of claim 1 further comprising impregnating at least two of the layers of reinforcement elements with different shapes.

15. The method of claim 1 further comprising growing at least two of the layers of reinforcement elements with different shapes.

16. The method of claim 1 further comprising growing at least two of the layers of reinforcement elements with different packing densities.

17. The method of claim 1 further comprising growing at least two of the layers of reinforcement elements with differently aligned reinforcement elements.

18. The method of claim 1 further comprising growing at least one of the layers of reinforcement elements with a packing density which varies across the layer.

19. The method of claim 1 wherein at least one of the layers of reinforcement elements is only partially impregnated with the matrix through a first part of its thickness, leaving a second part of the thickness of the layer exposed whereby a next layer of the layers of reinforcement elements partially overlaps with it.

20. The method of claim 1 wherein over 50% by weight of the matrix comprises a catalytic matrix material which catalyses the growth of the next layer.

21. The method of claim 20 wherein the catalytic matrix material comprises Iron, Nickel, Cobalt or an alloy thereof.

22. The method of claim 1 wherein over 50% by weight of the matrix comprises a metal matrix material.

23. The method of claim 1 wherein the matrix comprises substantially pure carbon.

24. The method of claim 1 wherein each of the layers of reinforcement elements is impregnated by vapour or spray deposition of a series of layers of matrix material.

25. The method of claim 24 wherein each of the layers of reinforcement elements is impregnated by chemical vapour deposition, physical vapour deposition or plasma spray deposition of a series of layers of matrix material.

26. The method of claim 25 wherein each of the layers of reinforcement elements is impregnated by chemical vapour deposition of pyrolytic carbon.

27. The method of claim 24 further comprising masking different selected areas of at least two of the layers of reinforcement elements with different shaped masks during the impregnation process whereby different areas of the at least two of the layers of reinforcement elements are impregnated by vapour or spray deposition.

28. The method of claim 1 wherein the ratio $t_1$ to $t_m$ is greater than or equal to 1.05:1.

29. A method of manufacturing a composite material, comprising:
   growing a first reinforcement layer of reinforcement elements to a thickness, $t_1$, in-situ, wherein the reinforcement elements are formed from a reinforcement material, and wherein the first reinforcement layer of grown reinforcement elements is arranged to have unoccupied space between adjacent reinforcement elements;
   impregnating at least a portion of the unoccupied space of the first reinforcement layer with a first matrix layer comprising a matrix material, wherein the first matrix layer has a thickness $t_m$, and wherein the thickness $t_1$ is greater than thickness $t_m$ so that part of the thickness of the first reinforcement layer is not impregnated by the first matrix layer, and thereafter growing a second reinforcement layer of reinforcement elements, in-situ, wherein the reinforcement elements are formed from a reinforcement material, and wherein the second reinforcement layer of grown reinforcement elements is arranged to have unoccupied space between adjacent reinforcement elements, and thereafter impregnating at least a portion of the unoccupied space of the second reinforcement layer with a second matrix layer comprising a matrix material, and wherein each layer of reinforcement is impregnated by capillary action.

30. A method of manufacturing a composite material, comprising:

growing a first reinforcement layer of reinforcement elements to a thickness, $t_1$, in-situ, wherein the reinforcement elements are formed from a reinforcement material, and wherein the first reinforcement layer of grown reinforcement elements is arranged to have unoccupied space between adjacent reinforcement elements;

impregnating at least a portion of the unoccupied space of the first reinforcement layer with a first matrix layer comprising a matrix material, wherein the first matrix layer extends continuously over a thickness $t_m$, a width w and a length l, wherein the width w and the length l are significantly greater than $t_m$, and wherein the thickness $t_1$ is greater than thickness $t_m$ so that part of the thickness of the first reinforcement layer is not impregnated by the first matrix layer, and thereafter growing a second reinforcement layer of reinforcement elements, in-situ, wherein the reinforcement elements are formed from a reinforcement material, and wherein the second reinforcement layer of grown reinforcement elements is arranged to have unoccupied space between adjacent reinforcement elements, and thereafter impregnating at least a portion of the unoccupied space of the second reinforcement layer with a second matrix layer comprising a matrix material.

* * * * *